United States Patent
Hama et al.

(10) Patent No.: US 10,218,873 B2
(45) Date of Patent: Feb. 26, 2019

(54) APPARATUS AND METHOD THAT PROCESS IMAGE DATA BY USING CODE, AND STORAGE MEDIUM

(71) Applicant: CANON KABUSHIKI KAISHA, Tokyo (JP)

(72) Inventors: Mikio Hama, Abiko (JP); Yosui Naito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 14/989,171

(22) Filed: Jan. 6, 2016

(65) Prior Publication Data

US 2016/0212298 A1 Jul. 21, 2016

(30) Foreign Application Priority Data

Jan. 16, 2015 (JP) .................................. 2015-006578
Jul. 2, 2015 (JP) .................................. 2015-133836

(51) Int. Cl.
*G06K 9/00* (2006.01)
*H04N 1/32* (2006.01)
(Continued)

(52) U.S. Cl.
CPC ..... *H04N 1/32133* (2013.01); *G06K 9/00442* (2013.01); *G06K 9/183* (2013.01);
(Continued)

(58) Field of Classification Search
None
See application file for complete search history.

(56) References Cited

U.S. PATENT DOCUMENTS 5,890,179 A 3/1999 Naito
2004/0099741 A1* 5/2004 Dorai ...................... G06K 7/14
235/462.08
(Continued)

FOREIGN PATENT DOCUMENTS

JP 06-178085 A 6/1994
JP 2000013586 A 1/2000
(Continued)

OTHER PUBLICATIONS

Japanese Office Action issued in corresponding Japanese Application No. 2015-133836 dated Jan. 8, 2019.

*Primary Examiner* — John R Wallace
(74) *Attorney, Agent, or Firm* — Venable LLP

(57) ABSTRACT

It is made possible to perform a code search both at a high speed and with efficiency based on a position specified by a user. An apparatus includes an operation unit configured to receive a position instructed by a user, the instructed position indicating a position of a code that exists on a document, a scan unit configured to obtain image data by scanning a document after the operation unit receives the instructed position, a search unit configured to search for a code at a position corresponding to the instructed position in the image data obtained by the scan unit, a decoding unit configured to obtain information by decoding the code that has been found by the search unit, and a processing unit configured to perform processing for the image data based on information that is obtained by the decoding.

15 Claims, 18 Drawing Sheets

(51) Int. Cl.
*G06K 9/18* (2006.01)
*G06K 9/20* (2006.01)
*H04N 1/387* (2006.01)

(52) U.S. Cl.
CPC ......... *G06K 9/2063* (2013.01); *G06K 9/2081* (2013.01); *H04N 1/3872* (2013.01); *H04N 2201/0094* (2013.01)

(56) References Cited

U.S. PATENT DOCUMENTS

2007/0192335 A1* 8/2007 Sugiura ............. G06F 17/30011
2011/0240740 A1* 10/2011 Li ....................... G06K 7/1443
                                                                                                  235/462.09

FOREIGN PATENT DOCUMENTS

| | | | |
|---|---|---|---|
| JP | 2007306228 A | 11/2007 | |
| JP | 2008263283 A | 10/2008 | |
| JP | 4861255 A | 1/2012 | |
| WO | 2005062186 A1 | 7/2005 | |

* cited by examiner

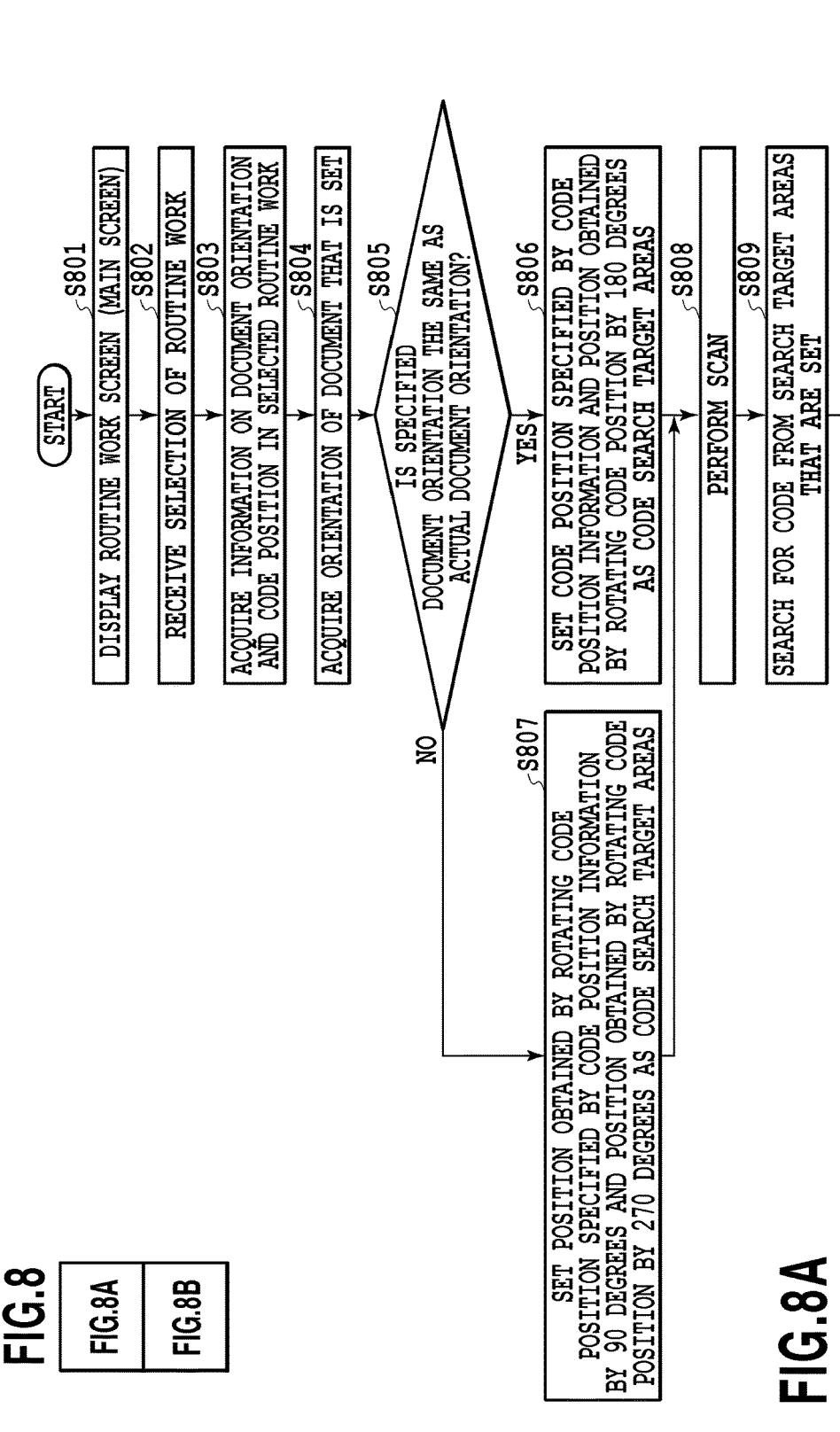

FIG.11A

204-B
USER:SUZUKI
DIVISION:SALES DEVELOPMENT DIVISION I
SECTION:SALES DEVELOPMENT SECTION II
ARTICLE:NotePC 202
A COMPANY DELIVERY SLIP
203  IN CHARGE OF SUZUKI
ARTICLE NAME | NUMBER OF ARTICLES | SUBTOTAL
ARTICLE A | THREE | 300 YEN
ARTICLE B | TWO | 400 YEN
TOTAL 700 YEN

FIG.11B

CODE SETTING ~1000
<TAG SETTING> ~1010
TAG 1 | USER: ~1011
TAG 2 | DIVISION: ~1012
TAG 3 | SECTION: ~1013
TAG 4 | ARTICLE: ~1014
<DELIMITER SETTING> ~1015
LINEFEED ▽ ~1016
<CHARACTER CODE> ~1017
UTF-8 ▽ ~1018
NEXT ~1019

FIG.11C

FOLDER NAME SETTING ~1020
TAG 2 ▽ ~1021  TAG 3 ▽ ~1022  [ ] ~1023
DATE
TAG 1
TAG 2
TAG 3
TAG 4
NO TAG 1 ~1026
1024 <KIND OF LINKING CHARACTER>
1025  _ (UNDER BAR) ▽
FOLDER NAME:
(DIVISION)_(SECTION)
NEXT ~1027

FIG.11D

FILE NAME SETTING ~1030
TAG 1 ▽ ~1031  TAG 4 ▽ ~1032  [ ] ~1033
DATE
TAG 1
TAG 2
TAG 3
TAG 4
NO TAG 1
1034 <KIND OF LINKING CHARACTER>
1035  - (HYPHEN) ▽
FILE NAME: ~1036
(USER)-(ARTICLE)-YYMMDDhhmm
SET ~1037

FIG.12A

A COMPANY DELIVERY SLIP — 202
203
IN CHARGE OF SUZUKI

| ARTICLE NAME | NUMBER OF ARTICLES | SUBTOTAL |
|---|---|---|
| ARTICLE A | THREE | 300 YEN |
| ARTICLE B | TWO | 400 YEN |
| | TOTAL | 700 YEN |

204-C
A COMPANY DELIVERY SLIP:
A COMPANY FOLDER

CODE SETTING — 1010
<TAG SETTING>
TAG 1 — 1011
TAG 2 — 1012
TAG 3 — 1013
TAG 4 — 1014

<DELIMITER SETTING> — 1015
▽ — 1016

<CHARACTER CODE> — 1017
EUC ▽ — 1018
NEXT — 1019

FOLDER NAME SETTING
NO TAG 2 ▽ — 1021
▽ — 1022
▽ — 1023

TAG 2
TAG 3
TAG 4
NO TAG 1
NO TAG 2
NO TAG 3

1024
<KIND OF LINKING CHARACTER>
NONE ▽ — 1025
NEXT — 1027

FOLDER NAME: — 1026
(NO TAG 2)

FILE NAME SETTING
NO TAG 1 ▽ — 1031
▽ — 1032
▽ — 1033

TAG 2
TAG 3
TAG 4
NO TAG 1
NO TAG 2
NO TAG 3

1034
<KIND OF LINKING CHARACTER>
NONE ▽ — 1035
SET — 1037

FILE NAME: — 1036
(NO TAG 1)

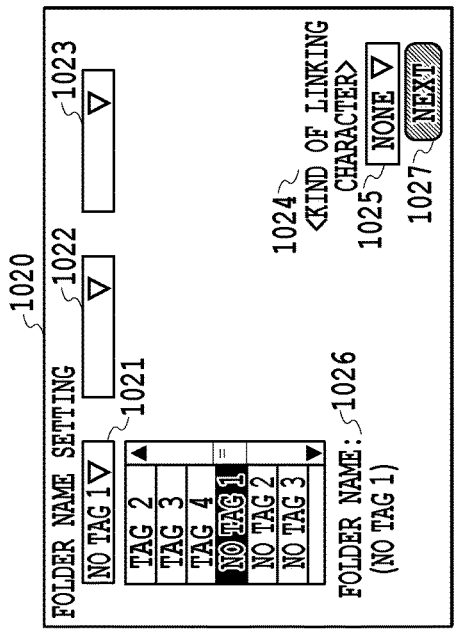
FIG.14A
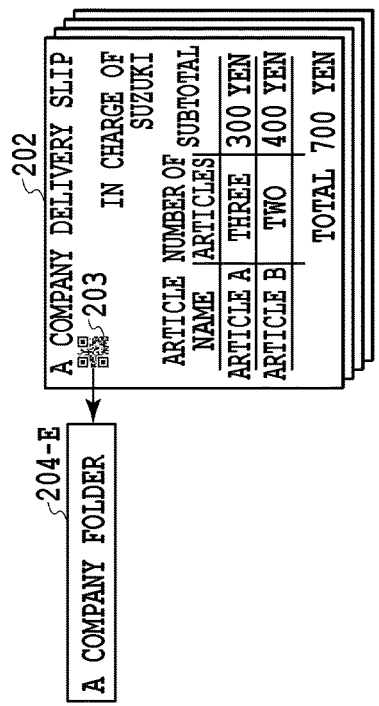
FIG.14B
FIG.14C
FIG.14D

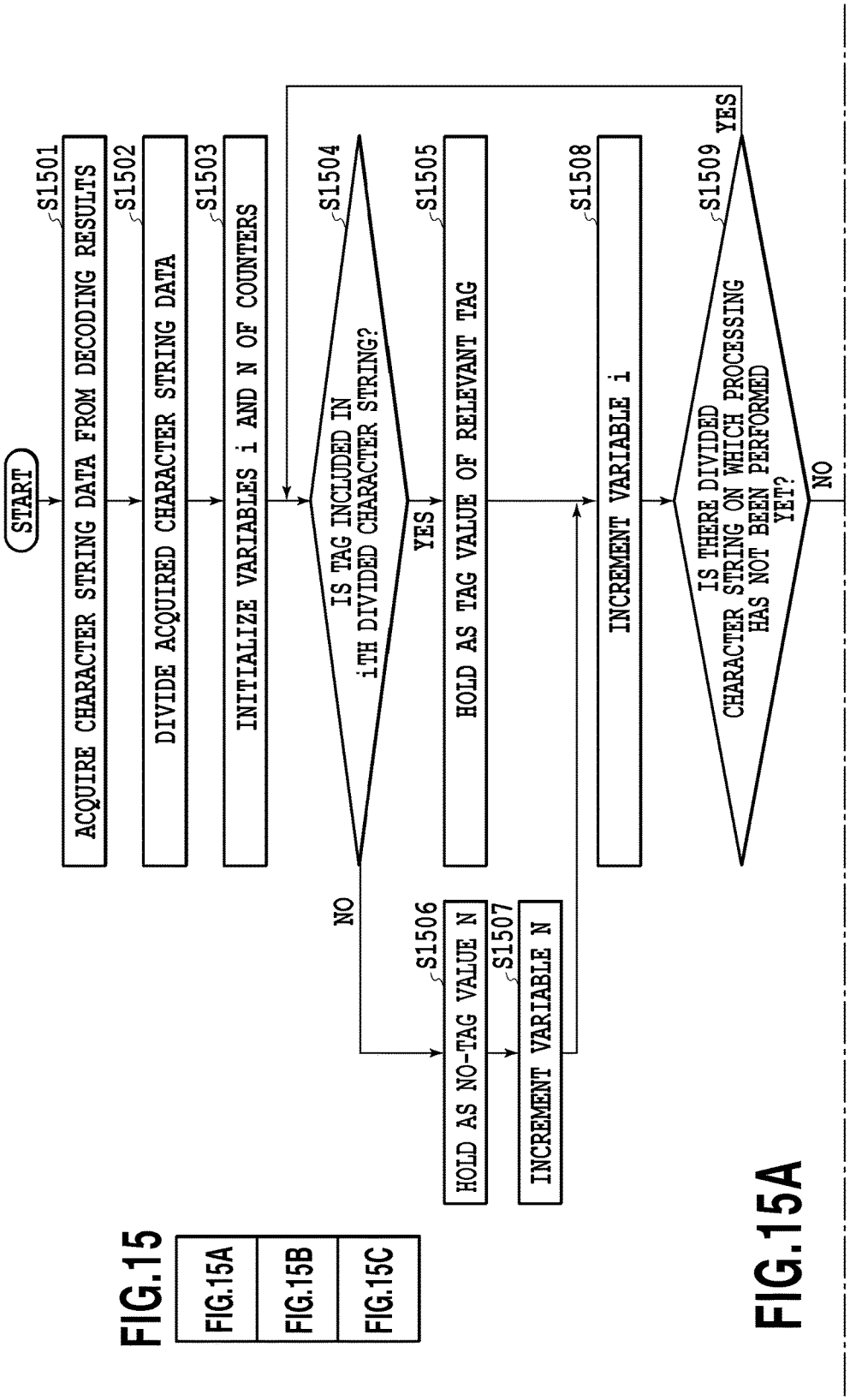

APPARATUS AND METHOD THAT PROCESS IMAGE DATA BY USING CODE, AND STORAGE MEDIUM

BACKGROUND OF THE INVENTION

Field of the Invention

The present invention relates to a technique that extracts a code that exists on a document from image data obtained by scanning the document and processes the image data.

Description of the Related Art

A technique is known, which generates image data by scanning a document, searches for a code (e.g., barcode, two-dimensional code, digital watermark, etc.) from the image data, decodes the code that has been found, and processes the image data in accordance with information that is obtained by decoding. For example, Japanese Patent No. 4861255 has disclosed the technique to read a QR code (registered trademark) from image data that is obtained by scanning a document and to rotate the orientation of the image data by analyzing the rotation state of the image data from the read QR code.

Further, WO2005/062186 has disclosed the technique to change a file name of an image file (or folder name of a folder) that has already been stored in a storage medium, such as a memory card, by using a code, such as a barcode. Specifically, in the case where it is desired to change a file name or a folder name, first, the image file to be processed (or folder to be processed) is selected. After this, the image of a desired code is captured from a code list sheet, a file name (or folder name) is generated by using the results of recognizing the captured code, and the file name (or folder name) is changed.

However, in the case of the technique of Japanese Patent No. 4861255 described above, it is necessary to search for a code from the whole of the image data, and therefore, it takes much time to search for a code. Further, a technique to search for a code from the four corners of image data in the case where a code is searched for from the image data is also known. This technique has a first problem in that wasteful processing results because the positions of the four corners that are determined in advance are always searched, and therefore, the area where no code exists is always searched, or in that it is not possible to find a code in the case where a code exists at a position other than the four corners.

Further, in the case where the configuration is designed so that a code that is extracted from image data is decoded, a file name is generated by using information obtained by the decoding, and the file name is attached to the image data as in WO2005/062186 described above, a second problem such as below will occur. The technique of WO2005/062186 requires to separately prepare a dedicated code list sheet in addition to the image data to be processed, and does not suppose the case where a code is embedded within the image data to be processed. In the case where a code that is embedded within the image data to be processed is utilized, it is necessary to cope with the possibility that a code will be created in the format unique to each image to be processed. In other words, in view of the possibility that various parameters are encoded in various formats, it is necessary to take measures as to how to interpret character strings in the various formats, which are obtained by decoding the parameters.

SUMMARY OF THE INVENTION

An apparatus according to the present invention for solving the first problem described above has an operation unit configured to receive a position instructed by a user, the instructed position indicating a position of a code that exists on a document, a scan unit configured to obtain image data by scanning a document after the operation unit receives the instructed position, a search unit configured to search for the code at a position corresponding to the instructed position in the image data obtained by the scan unit, a decoding unit configured to obtain information by decoding the code that has been found by the search unit, and a processing unit configured to perform processing for the image data based on the information obtained by the decoding.

Further, an apparatus according to the present invention for solving the second problem described above has a unit capable of registering a plurality of tags included in a code that exists on a document, a unit configured to register a delimiter for delimiting one or more parameters included in the code, a unit configured to extract data from the code, a unit configured to divide the data that is extracted by using the delimiter registered in advance, and a unit configured to acquire a tag value from the data divided by using the tag registered in advance.

Further features of the present invention will become apparent from the following description of exemplary embodiments (with reference to the attached drawings).

BRIEF DESCRIPTION OF THE DRAWINGS

FIGS. 7A to 7F are diagrams explaining the ways a document is placed and areas in which a code is searched for;

FIGS. 11A to 11D are diagrams explaining an example in the case where a plurality of parameters, such as a user name and a division name, is embedded with tags attached in a code that is attached to a template;

FIGS. 12A to 12D are diagrams explaining an example in the case where a file name and a folder name are embedded with no tag attached in a code that is attached to a template;

FIGS. 14A to 14D are diagrams explaining an example in the case where only a folder name is embedded with no tag attached in a code that is attached to a template; and FIG. 15 is a diagram showing a relationship among FIGS. 15A to 15C, and FIGS. 15A, 15B and 15C are flowcharts showing a flow of processing to determine and save a storage destination folder and a file name of generated scanned image data according to a second embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, an aspect is explained, in which a two-dimensional code is searched for from image data that is obtained by scanning a document and the two-dimensional code is decoded, then a folder name and a file name are determined based on information that is obtained by decoding, and the image data of the document is stored in a file server.

Figure 1:
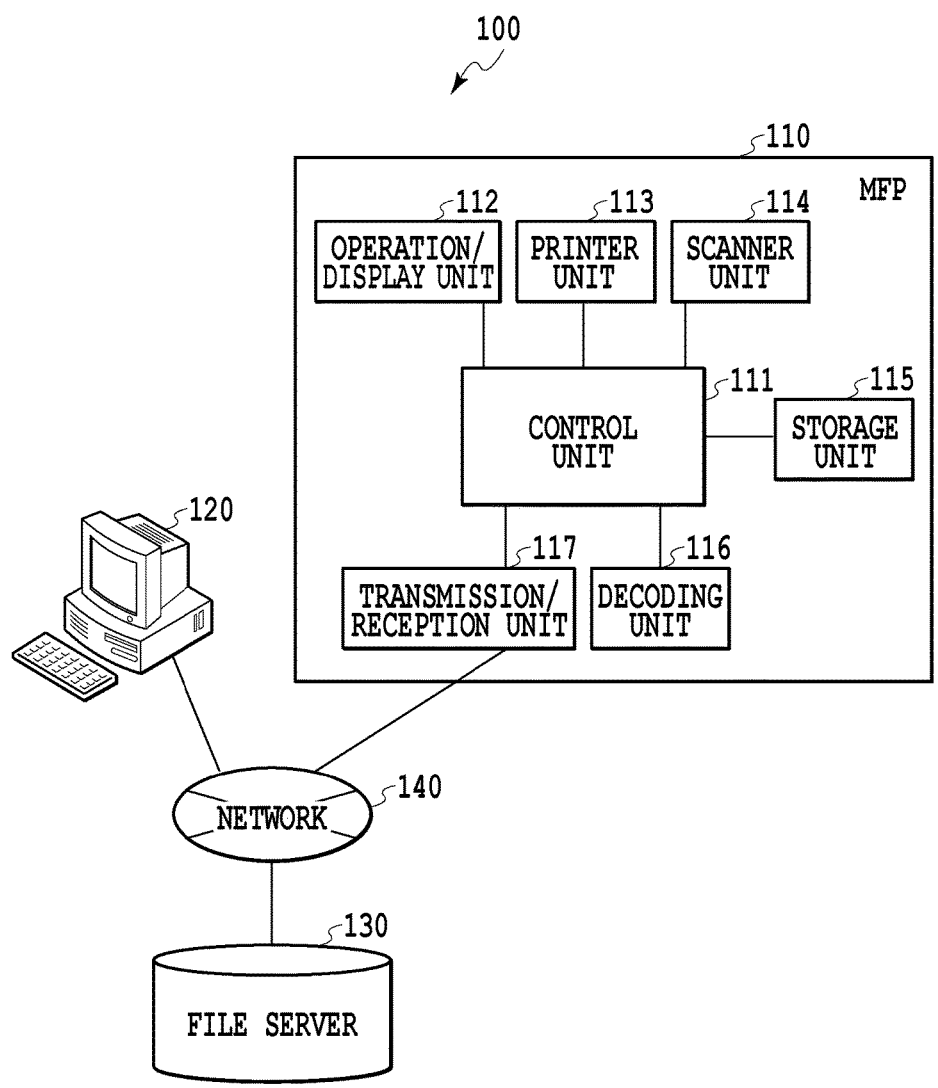
FIG. 1 is a diagram showing an example of a configuration of a file management system.

FIG. 1 is a diagram showing an example of a configuration of a file management system according to the present embodiment. A file management system 100 includes an MFP 110, a PC 120, and a file server 130. These are connected to one another via a network 140, such as a LAN.

The MFP 110 is an image forming apparatus called a so-called MFP (Multi Function Peripheral) including a plurality of functions, such as a function as a printer and a function as a scanner. The MFP 110 includes a control unit 111, an operation/display unit 112, a printer unit 113, a scanner unit 114, a storage unit 115, a decoding unit 116, and a transmission/reception unit 117.

The control unit 111 includes various I/Fs with the operation/display unit 112 and the printer unit 113, in addition to the CPU, ROM, and RAM, and totally controls the MFP 100.

The operation/display unit 112 includes a liquid crystal panel or the like, which has a touch screen function, and displays various kinds of information to a user and receives a user's operation, such as instructions for scan.

The printer unit 113 prints an image on a printing medium, such a paper, by using image data that is received from the control unit 111.

The scanner unit 114 generates image data by scanning a document that is set on a document table or an ADF. Hereinafter, image data of a document that is obtained by a scan is referred to as "scanned image data".

The storage unit 115 is, for example, an HDD and stores various kinds of data, such as user setting information.

The decoding unit 116 performs processing to search for a two-dimensional code (hereinafter, code), such as a QR code, from scanned image data, and processing to decode the code that has been found in the search (decoding processing).

The transmission/reception unit 117 performs transmission and reception of data with an external device, such as the PC 120 and the file server 130.

The PC 120 is an information processing device that, for example, creates a document attached with a code.

The file server 130 is an information processing apparatus that saves and manages various kinds of data files, such as scanned image data that is utilized by the MFP 110, by sorting them into a folder having a hierarchical structure.

[About Code-Attached Document]

Figure 2:
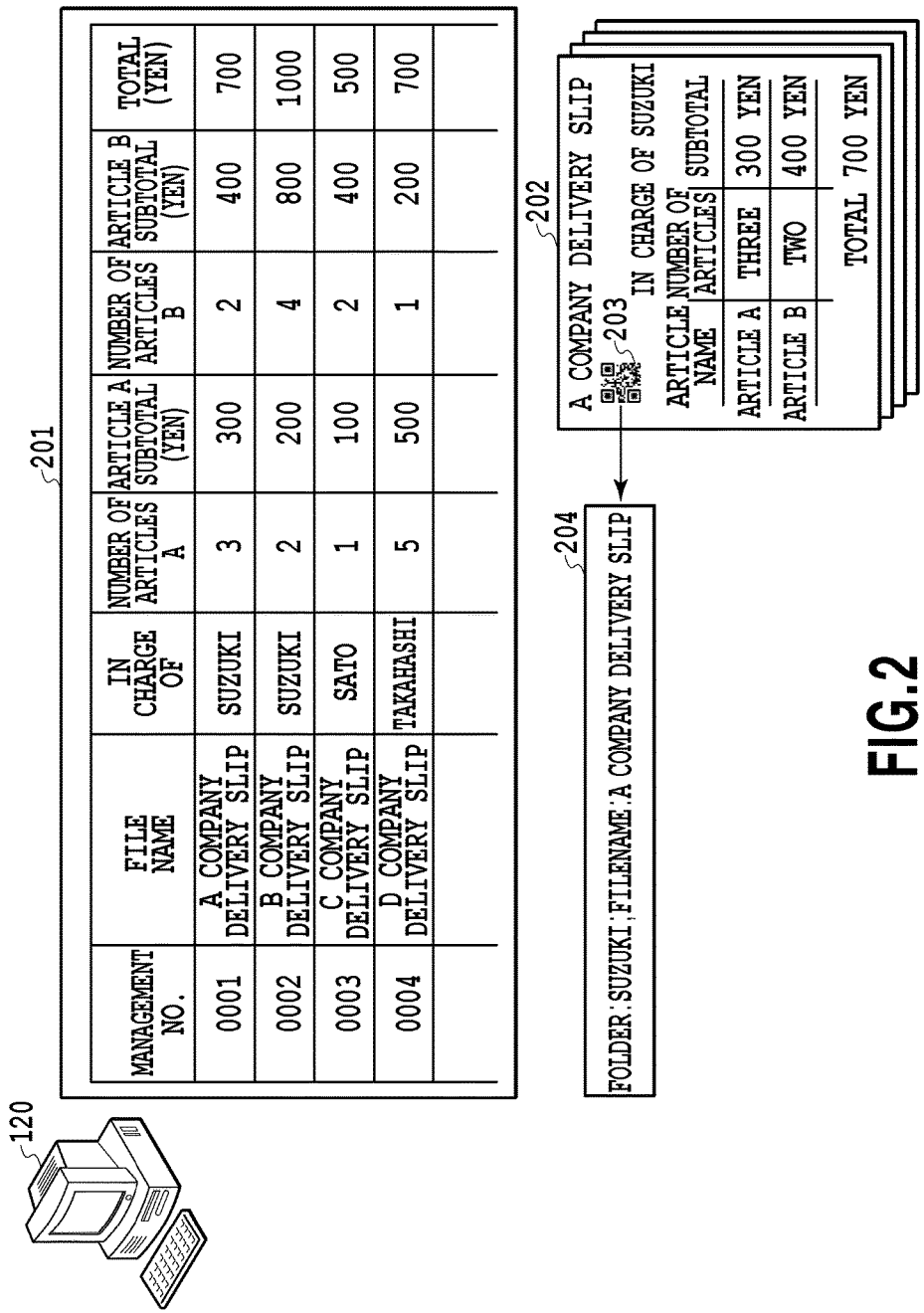
FIG. 2 is a diagram explaining the way a code-attached document is created by a PC.

Next, a document to which a code (QR code) is attached and which is a target of scan by the scanner unit 114 of the MFP 110 in the present embodiment is explained. FIG. 2 is a diagram explaining the way a code-attached document is created by the PC 120. In the example in FIG. 2, a template (here, delivery slip) 202 to the top-left corner of which a QR code 203 is attached is created based on a CSV file 201 as a prototype file that describes which characters should be input for each item in accordance with a layout determined in advance. A reference symbol 204 indicates information (character string) that is obtained by decoding the QR code 203 and in this example, information for specifying a folder name "Suzuki" of the storage destination (sorting destination) of the file server 130 and information for specifying a file name at the time of delivery "A company delivery slip" are included.

[File Management Structure in File Server]

Figure 3:
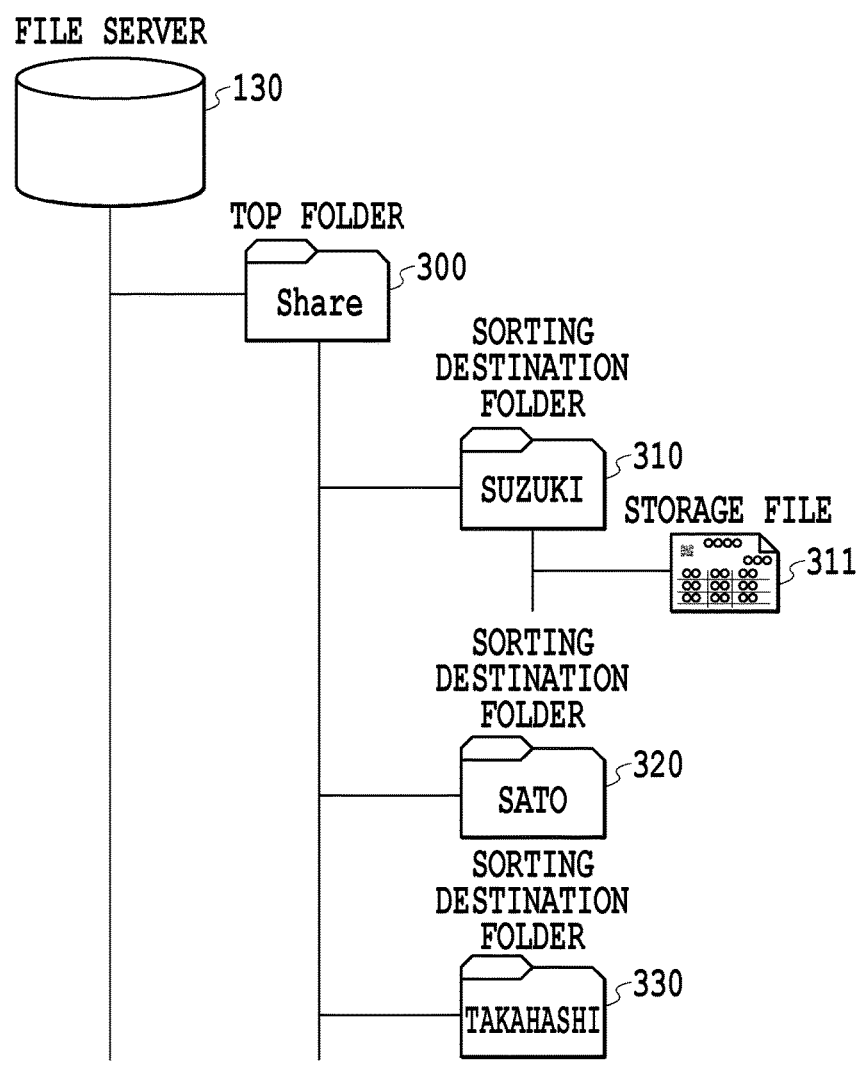
FIG. 3 is a diagram showing a file management structure in a file server.

FIG. 3 is a diagram showing a file management structure in the file server 130.

A top folder 300 is a folder in the uppermost layer of the file server 130, which serves as a reference at the time of storing files. Sorting destination folders 310 to 330 are subfolders located in the lower layer of the top folder 300 and in the present embodiment, each of the sorting destination folders 310 to 330 is associated with each user (subfolder 310: Suzuki, subfolder 320: Sato, subfolder 330: Takahashi). A storage file 311 is a file that is stored in the subfolder 310 and in the present embodiment, is the data of "A company delivery slip" shown in FIG. 2 described previously.

In the case of the code such as the QR code 203 shown in FIG. 2, the storage file is given a name of "A company delivery slip.pdf" 311 and is stored in the sorting destination folder "Suzuki" 310 under the top folder 300 "share" of the file server 130.

[Creation of Code-Attached Document]

Figure 4:
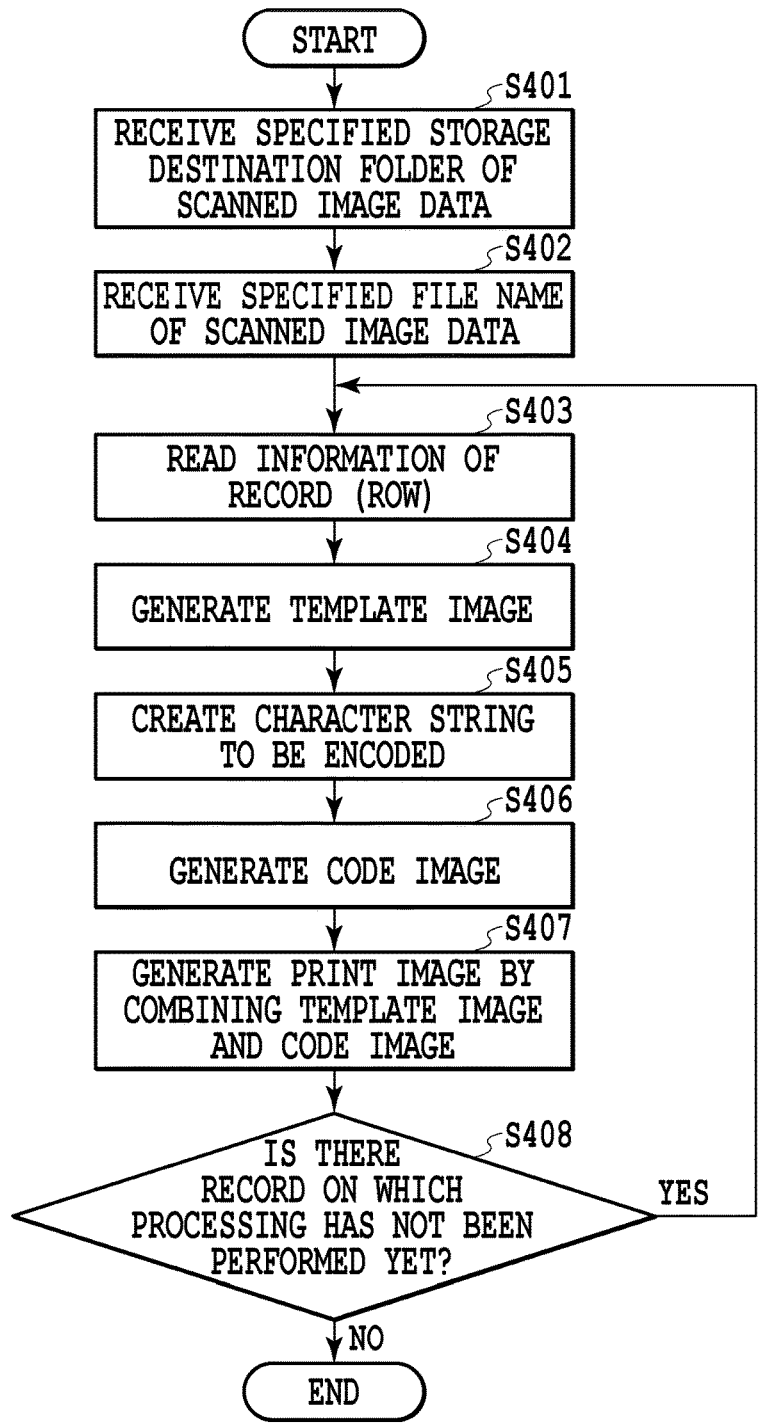
FIG. 4 is a flowchart showing a flow of processing to generate print image data from which a code-attached document is created.

Subsequently, a flow until a document to which a two-dimensional code (QR code, as an example) is attached is created in the PC 120 is explained. FIG. 4 is a flowchart showing a flow of processing to generate print image data from which a code-attached document is created. The series of processing is performed by the CPU executing a computer executable program in which the procedure shown below is described after reading the program from the ROM onto the RAM.

At step 401, by a user's operation via the operation unit (not shown) of the PC 120, a storage destination folder of scanned image data (file) is specified. In the present embodiment, the column of the prototype file (here, CSV file) that is used as a folder name and the character string that is used as a tag are specified. Specifically, as the column that is used as a folder name, the column of "IN CHARGE OF" is specified and as the character string that is used as a tag, "FOLDER:" is specified. The tag is a mark for extracting specific information from the character string that is obtained by decoding the tag and is used to extract information about, for example, who is "In charge of", from the character string.

At step 402, by a user's operation via the operation unit (not shown) of the PC 120, the file name at the time of saving the scanned image data is specified. In the present embodiment, the column of the CVS file that is used as the file name and the character string that is used as the tag are specified. Specifically, as the column that is used as a file name, the column of "Filename" is specified and as the character string that is used as a tag, "FILENAME:" is specified.

At step 403, the information of the record (row) of the CSV file is read sequentially. For example, in the order from the management number "0001", "0002", "0003", and so on, is read from the upper row toward the lower row.

At step 404, template image data is generated in accordance with information of each field of the read record.

At step 405, the information of the field that is read at step 404 and the tag that is specified at steps 401 and 402 are combined and a character string that is the target of encoding is created. In the example described above, the character string that is encoded is "FOLDER: Suzuki; FILENAME: A company delivery slip".

At step 406, code image data is generated from the character string that is created at step 405.

At step 407, the template image data that is generated at step 404 and the code image data that is generated at step 406 are combined, and thereby, print image data is generated. The generated print image data is transmitted to the MFP 110 via the transmission/reception unit 117 and is subjected to printing processing.

At step 408, whether the generation of print image data has been completed for all the records within the CSV file is determined. In the case where there is a record on which the processing has not been performed yet, the processing returns to step 403, and the next record is taken to be the target and the processing is repeated. On the other hand, in the case where the generation of print image data has been completed for all the records, the present processing is terminated.

The above is the contents of the processing to generate print image data from which a code-attached document is created. The print image data that is generated in this manner is subjected to printing processing in the MFP 110 and a code-attached document as a template is created.

[Preparation Processing of Routine Work Processing]

Subsequently, the preparation processing of routine work processing in the MFP 110 is explained. Here, the routine work in the present embodiment refers to processing to scan the template (code-attached document) that is created as described above by the scanner unit 114 of the MFP 110 and to store the obtained scanned image data in a folder on the file server 130 for each person in charge after attaching a file name.

Figure 5:
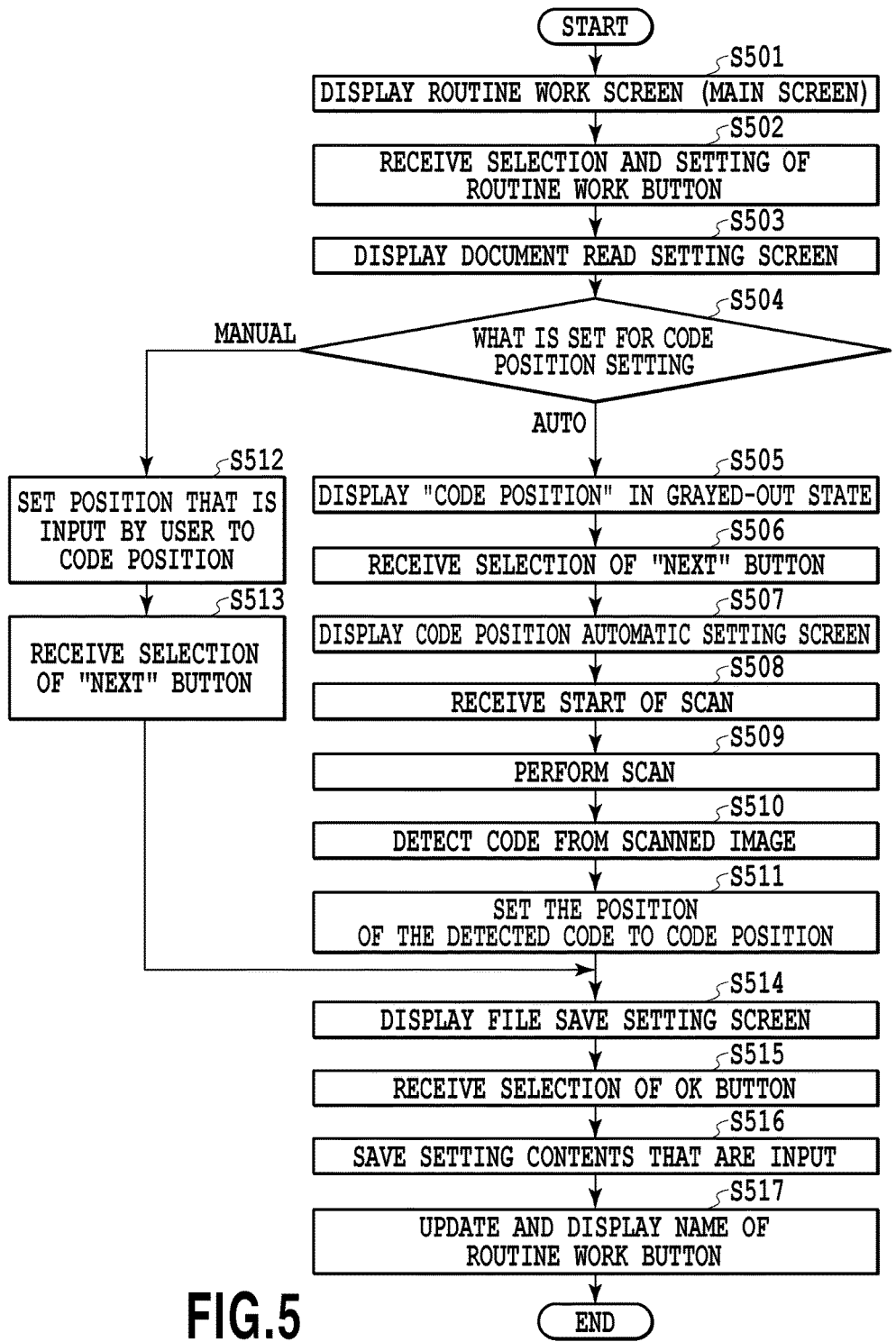
FIG. 5 is a flowchart showing a flow of routine work button setting processing.

Before explaining the flow of the actual routine work processing, the preparation processing thereof is explained. Specifically, the setting of a UI button (routine work button) in accordance the contents of the routine work on the routine work screen as a user interface screen that is displayed on the operation/display unit 111 of the MFP 110, which a user uses at the time of performing the routine work is, explained. FIG. 5 is a flowchart showing a flow of routine work button setting processing. In the following, in FIGS. 6A to 7F, explanation is given while appropriately referring to an example of the UI screen that is used at the time of routine work.

Figure 6A:
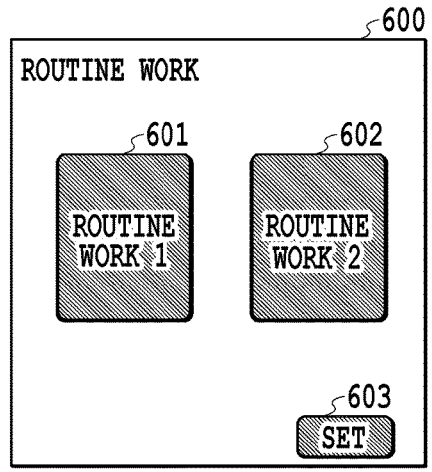
FIGS. 6A to 6E are diagrams each showing an example of a UI screen that is used at the time of routine work.

At step 501, the control unit 111 displays a routine work screen on the operation/display unit 112. FIG. 6A is an example of the main screen of a routine work screen and first, such a main screen 600 is displayed on the operation/display unit 112. Buttons 601 and 602 within the main screen 600 are routine work buttons and are provided in accordance with the kinds of the individual routine work (i.e., template) and after the setting is completed, the name is updated to a name that is specified by a user (see FIG. 6E, to be described later). FIG. 6A shows a default state where individual routine work is not set and the two routine work buttons 601 and 602, i.e., a "Routine work 1" button and a "Routine work 2" button exist. Of course, the number of pieces of routine work that can be set is not limited to two and it may also be possible to set more routine work buttons. A Set button 603 is a button that is pressed down at the time of performing a setting of the routine work button.

At step 502, the control unit 111 receives user's selection of the routine work button 601 or 602 and the pressing-down of the Set button 603. Here, it is assumed that the Routine work button 601 corresponding to "Routine work 1" is selected.

Figure 6B:
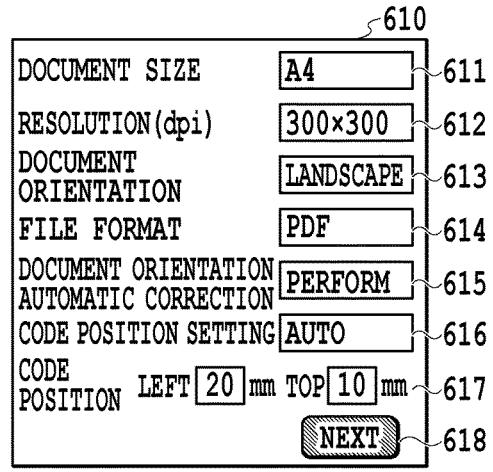
Figure 6C:
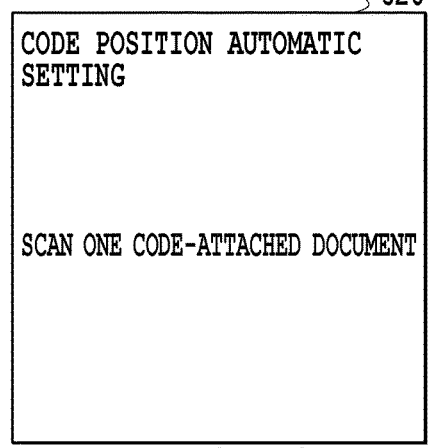

At step 503, the control unit 111 displays a document read setting screen on the operation/display unit 112. FIG. 6B is an example of the document read setting screen. The user inputs the document size, resolution, etc., on such a Document read setting screen 610. In the following, each item is explained in detail. On the Document read setting screen 610 shown in FIG. 6B, an area 611 is an area where the size of a document to be scanned is input and here, "A4" is input. An area 612 is an area where resolution at the time of read is input and here, "300×300" is input, and therefore, scan processing is performed with a resolution of 300 dpi. An area 613 is an area where the orientation of a document is input and here, "Landscape" is input. In the case of a document in the portrait mode, "Portrait" is input. An area 614 is an area where a file format is input and here "PDF" is input, and therefore, image data that is read is saved in the PDF format. An area 615 is an area where whether the automatic correction of the orientation of a document is performed is specified and here "Perform" is specified, but in the case where a user does not desire the automatic correction, "Do not perform" is input. An area 616 is an area where whether the position of a code that is attached to a document is automatically detected from a sample document and set, or "Manual" is set is specified, and an area 617 is an area where numerical values indicating the code position are input and displayed. Here, in the area 616, "Auto" is specified. In this case, a Code position automatic setting screen 620 as shown in FIG. 6C is displayed on the operation/display unit 112 and it is possible for a user to automatically set the code position by setting a document to which a code is attached (sample document) on a document table or the like and causing the document to be read. Due to this, for example, the values ("Left: 20 mm" "Top 10 mm") as shown in the area 617 are determined automatically. In the case where "Manual" is input in the area 616, the user directly inputs and sets two numerical values in the area 617.

At step 504, the control unit 111 determines whether the contents that are input in the area 616 for setting the code position described above is "Auto" or "Manual". In the case where the results of the determination indicate "Auto", the processing proceeds to step 505. On the other hand, in the case of "Manual", the processing proceeds to step 512.

At step 505, the control unit 111 displays the area 617 of the code position in the grayed-out state on the above-described Document read setting screen 610.

At step 506, the control unit 111 receives user's pressing-down of a "Next" button 618 on the above-described Document read setting screen 610.

At step 507, the control unit 111 displays the above-described Code position automatic setting screen (FIG. 6C) on the operation/display unit 112. In response to this, the user sets the document to be read on the document table or the like.

At step 508, the control unit 111 receives instructions to perform a scan on the operation/display unit 112 (e.g., pressing-down of a Start button (not shown)).

At step 509, the control unit 111 gives instruction to scan the document to the scanner unit 114 and upon receipt of the instructions, the scanner unit 114 scans the document and generates scanned image data. The generated scanned image data is sent to the decoding unit 116.

At step 510, the decoding unit 116 detects the position where a code exists on the scanned image data based on the information (i.e., document size and document orientation) that is input for each item on the above-described Document read setting screen 610. The information on the coordinates or the like for specifying the position of the detected code (code position detection information) is sent to the control unit 111.

At step 511, the control unit 111 sets the code position in the area 617 on the above-describe Document read setting screen 610 in accordance with the code position detection information that is received from the decoding unit 116. After the code position is set automatically from the sample document, the processing proceeds to step 514.

At step 512, the control unit 111 sets the numerical values that the use has input directly in the area 617 on the above-described Document read setting screen 610 as the code position.

At step 513, the control unit 111 receives user's pressing-down of the "Next" button 618 on the above-described Document read setting screen 610. Due to this, the processing proceeds to step 514.

Figure 6D:
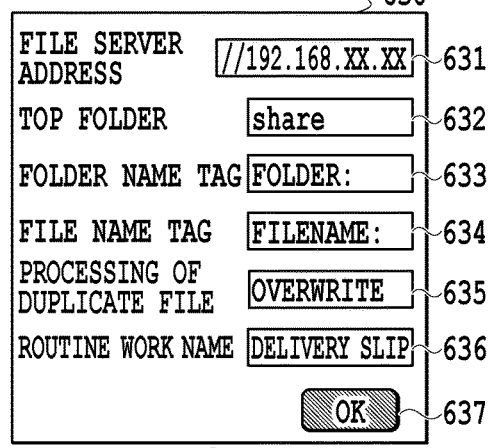

At step 514, the control unit 111 displays a file save setting screen on the operation/display unit 112. FIG. 6D is a diagram showing an example of a file save setting screen. On a File save setting screen 630, an area 631 is an area where an address of the file server 130 is specified and here, "//192.168.XX.XX" is specified. An area 632 is an area where the top folder of the file server 130 is specified and here, "share" is specified. An area 633 is an area where a folder name tag is specified and here, "FOLDER:" is specified. In the case where the folder name tag "FOLDER:" exists within the character string that is obtained by decoding the code within the document, the character string that follows the tag is taken to be the storage destination folder name. An area 634 is an area where a file name tag is specified and here, "FILENAME:" is specified. In the case where the file name tag "FILENAME:" exists within the character string that is obtained by decoding the code within the document, the character string that follows the tag is taken to be the file name. An area 635 is an area where processing in the case where a file with the same name already exists in the storage destination folder and two files with the same name will exist simultaneously as a result is specified and here, "Overwrite" is specified, but in the case where it is not desired to overwrite-save the file, "Do nothing" is input. It may also be possible to design a configuration in which in the case where a setting is performed so as to save the file with another name, a character string, such as a number, is automatically added to the end of the file name specified by the code, and thus, the file name is attached to the file. An area 636 is an area where the name of the routine work is specified and here "Delivery slip" is specified. After inputting has been completed for all the items, a user presses down an OK button 637.

At step 515, the control unit 111 receives user's pressing-down of the OK button 637 on the above-described File save setting screen 630.

At step 516, the control unit 111 saves the contents for each item that are set by the processing performed hitherto as routine work corresponding to the "Routine work 1" in the storage unit 115 with the name (here, "Delivery slip") specified in the area 636 on the File save setting screen 630.

Figure 6E:
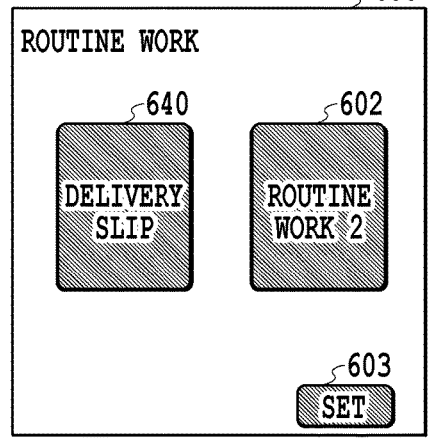

At step 517, the control unit 111 creates a routine work button whose button name is the specified routine work name and displays the main screen of the Routine work screen on which the "Routine work 1" is replaced with the name of the routine work button on the operation/display unit 112. FIG. 6E shows a main screen 600' of the Routine work screen on which the routine work button whose name is "Delivery slip" is displayed in place of the "Routine work 1". From now on, it is made possible for the user to create a delivery slip in the fixed format shown in FIG. 2 by pressing down a "Delivery slip" button 640.

The above is the flow until the UI button (Routine work button) in accordance with the contents of routine work is set. In the manner described above, the UI button at the time of performing routine work to create, for example, a delivery slip in the fixed format is created. In the case where it is desired to, for example, change the contents of the routine work that are set, it may be possible to perform a setting again by selecting the Set button 603 and performing the same processing after selecting a desired routine work button on the Routine work button.

[The Way Code-Attached Document is Placed and Code Position at the Time of Scan]

Here, the way a code-attached document is placed on a document table or the like of the MFP 110 and the code position at the time of scan are explained.

Conventionally, a scan is performed without specifying the position of a code that should exist on a document and the code is searched for across the entire scanned image data that is obtained, and therefore, it takes much time to detect a code. Consequently, in the present embodiment, as described above, a user is caused to specify the orientation of a document and the code position (see the Document read setting screen 610 shown in FIG. 6B described previously). Due to this, it is possible for the decoding unit 116 to perform a scan by taking only the position (search target area) specified on the document as a target, and therefore, it is made possible to perform a code search at a high speed.

Here, it is assumed that the position where a code exists on a document is in the top-left corner of the document in the case where "Landscape" is specified by a user as the orientation of the document (see the template 202 in FIG. 2). In the case where the document such as this is set on a document table or the like of the MFP 110, there are four ways the document is placed as shown in FIGS. 7A to 7D. Here, for example, in the case where the decoding unit 116 does not search the position other than the specified position on a condition that the values (Left: 20 mm, Top: 10 mm) that are specified in the area 617 in FIG. 6B are set as the code position, the code search will fail for the three ways the document is placed (FIGS. 7B to 7D) other that that in FIG. 7A.

Consequently, in the present embodiment, a code on a document is searched for as follows based on information on "Document orientation" and "Code position" that are set.

Figure 7A:
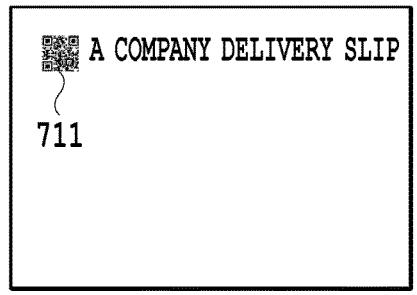
Figure 7B:
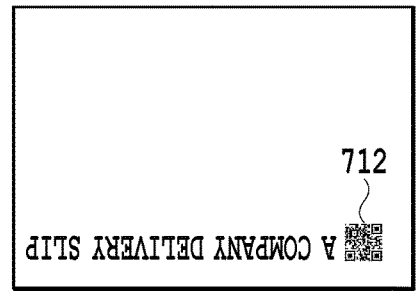

1) In the Case where a Document is Set with the Correct Orientation on a Document Table or the Like In FIG. 7A to 7D, the correct way the document is placed in the case where "Landscape" is specified as the "Document orientation" is two ways: the way the document is placed in the landscape mode at the correct position shown in FIG. 7A and the way the document is placed in the landscape mode at the opposite position shown in FIG. 7B. The code position that can be considered in the case of the two ways the document is placed is a position indicated by a symbol 711 in the case of the way the document is placed in the landscape mode at the correct position or a position indicated by a symbol 712 in the case of the way the document is placed in the landscape mode at the opposite position, which is obtained by rotating the position indicated by the symbol 711 by 180 degrees. Consequently, in the case where the document is set on a document table or the like with the correct orientation, in the present embodiment, a scan is performed by specifying two areas, i.e., an area indicated by a broken line 720 and an area indicated by a broken line 721, as the target areas of the code search by the decoding unit 116 (see FIG. 7E).

Figure 7C:
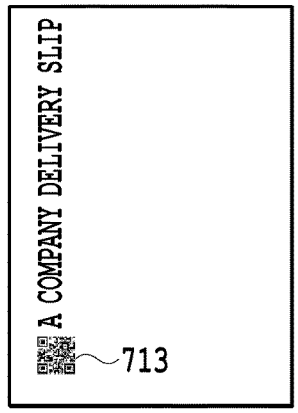
Figure 7D:
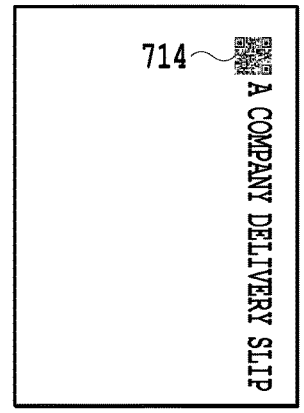
Figure 7E:
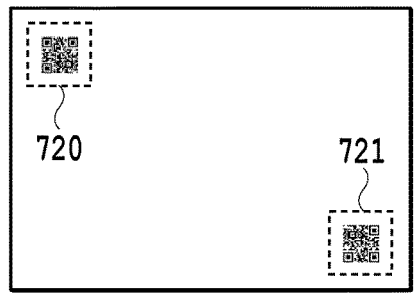
Figure 7F:
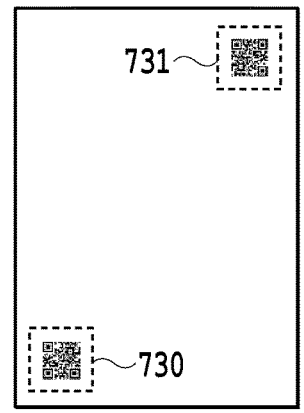

2) In the Case where a Document is Set with an Orientation Different from the Specified Orientation on a Document Table or the Like The correct way the document is placed in the case where "Landscape" is specified as the "Document orientation" is the correct position and the opposite position described above, and in the case where the document is set in the "Portrait" mode as shown in FIGS. 7C and 7D, the way the document is placed is different from the specified document orientation. The code position that can be considered in the case the way the document is placed such as this is a position indicated by a symbol 713 in the case where the document is placed as in FIG. 7C and a position indicated by a symbol 714, which is obtained by rotating the position indicated by the symbol 713 by 180 degrees, in the case where the document is placed as in FIG. 7D. Consequently, in the case where the document is set with an orientation different from the correct orientation on a document table or the like, in the present embodiment, a scan is performed by specifying two areas, i.e., an area indicated by a broken line 730 and an area indicated a broken line 731, as the target areas of the code search by the decoding unit 116 (see FIG. 7F).

[Routine Work Processing]

Next, the actual routine work processing in the MFP 100 is explained. The routine work processing is roughly classified into processing to detect and analyze a code by acquiring scanned image data of a document and processing to sort scanned image data into folders and to name a file. First, the former processing is explained.

Figure 8B:
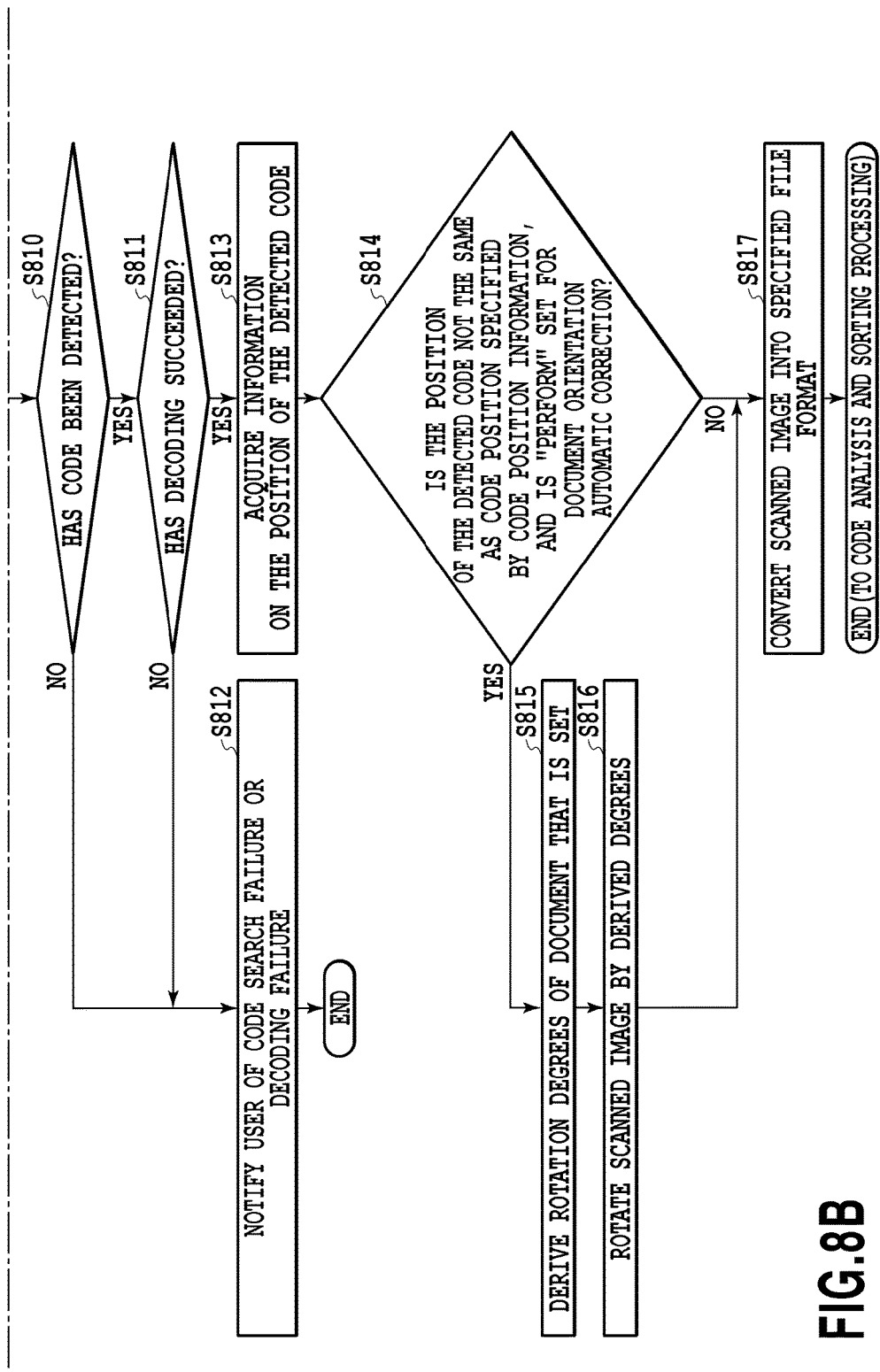
FIG. 8 is a diagram showing a relationship between FIGS. 8A and 8B, and FIGS. 8A and 8B are flowcharts showing a series of flows of acquisition of scanned image data from a document, and detection and analysis of a code.

FIGS. 8A and 8B are flowcharts showing a series of flows from acquisition of scanned image data from a document up to detection and analysis of a code.

At step 801, the control unit 111 displays the Routine work screen (see FIG. 6A) described previously on the operation/display unit 112.

At step 802, the control unit 111 receives user's selection of the routine work button. Here, it is assumed that the "Delivery slip" button 640 on the Routine work screen 600' shown in FIG. 6E is selected (pressed down).

At step 803, the control unit 111 acquires information on the document orientation (specified in the area 613 on the Document read setting screen 610) and the code position (specified in the area 617 on the Document read setting screen 610) specified in the selected routine work.

At step 804, the control unit 111 acquires the orientation of the document that is set on a document table or the like from the scanner unit 114.

As step 805, the control unit 111 determines whether the document orientation associated with the routine work, which is specified by the information acquired at step 803, is the same as the orientation of the document that is actually set, which is acquired at step 804. In the case where the results of the determination indicate that the orientation is the same, the processing proceeds to step 806. On the other hand, in the case where the orientations are different, the processing proceeds to step 807.

At step 806, the control unit 111 sets the two areas of the code position that is specified by the code position information acquired at step 803 and the position obtained by rotating the specified code position by 180 degrees (reversed position) as code search target areas.

At step 807, the control unit 111 sets the two areas of the position obtained by rotating the code position specified by the code position information acquired at step 803 by 90 degrees and the position obtained by rotating the specified position by 270 degrees as code search target areas.

At step 808, the scanner unit 114 scans the document that is set on a document table or the like in accordance with the instructions to read the document from the control unit 111. The scanned image data obtained by the scan is saved in the RAM and then, is sent to the decoding unit 116.

As step 809, the decoding unit 116 searches for a code from the scanned image data by taking the code positions that are set at step 806 to be the search target areas in accordance with the instructions to search for a code from the control unit 111.

At step 810, the control unit 111 determines whether a code has been detected in the search by the decoding unit 116. In the case where the results of the determination indicate that a code has been detected, the processing proceeds to step 811. On the other hand, in the case no code has been detected, the processing proceeds to step 812.

At step 811, the decoding unit 116 tries to decode the detected code in accordance with the instructions to decode the code from the control unit 111. In the case where the decoding has succeeded, the processing proceeds to step 813. On the other hand, in the case where the decoding has failed, the processing proceeds to step 812.

At step 812, the control unit 111 notifies a user of the fact that the code detection processing or code decoding processing has failed by, for example, displaying a message screen (not shown) on the operation/display unit 112.

At step 813, the control unit 111 acquires information on the position of the detected code from the decoding unit 116.

At step 814, the control unit 111 determines whether the position of the detected code does not agree with the code position specified by the code position information that is acquired at step 803 and whether "Perform" is set for Document orientation automatic correction. In the case where the results of the determination indicate that both the conditions are met, the processing proceeds to step 815. On the other hand, in the case where the results of the determination indicated that at least one of the conditions is not met, the processing proceeds to step 817.

At step 815, the control unit 111 derives the degrees (rotation degrees) between the position of the template supposed by the user and the actual position of the document based on the document orientation specified by the document orientation information that is acquired at step 803 and the actual document orientation, and the code position specified by the code position information that is acquired at step 803 and the actual code position.

At step 816, the control unit 111 rotates the scanned image that is obtained at step 808 by the amount corresponding to the degrees derived at step 815.

At step 817, the control unit 111 converts the scanned image that is obtained at step 808 or the scanned image that is obtained by performing the processing to rotate the scanned image by the degrees derived at step 815 into a file format (specified in the area 614 on the Document read setting screen 610) specified by a user.

The above is the contents of the processing to acquire the scanned image data of a document and to detect/analyze the code. As described above, in the present embodiment, a different position that is determined on the basis of the code position that is specified by the code position information is also set to be the search target area, and therefore, it is made possible to cope with the case where a code exists in an area other than the specified area while securing a code search faster than that in the case where the whole of a document is scanned.

After this processing, the processing proceeds to the processing to sort generated scanned image data into folders and to name a file.

The feature of the present embodiment is that the position (obtained by, for example, reversing the specified position) different from the code position specified by a user is also taken to be the search target, but the present embodiment is not limited to the aspect as described above. For example, it may also be possible for an administrator of the MFP 110 to register in advance a predetermined position (e.g., the top-left corner) on a document in the storage unit 115 as a code search target area and to set and register the position (e.g., the position diagonally opposite to the predetermined position, here, the bottom-right corner) that is determined on the basis of the predetermined position in addition to the predetermined position at the timing of the registration, so that by a user selecting the positions registered as a set (in the above-described example, the set of the top-left corner and the bottom-right corner) and giving instructions to perform a scan, a code is searched for from the image data obtained by scanning the document by taking the positions registered as a set to be the targets.

Figure 9:
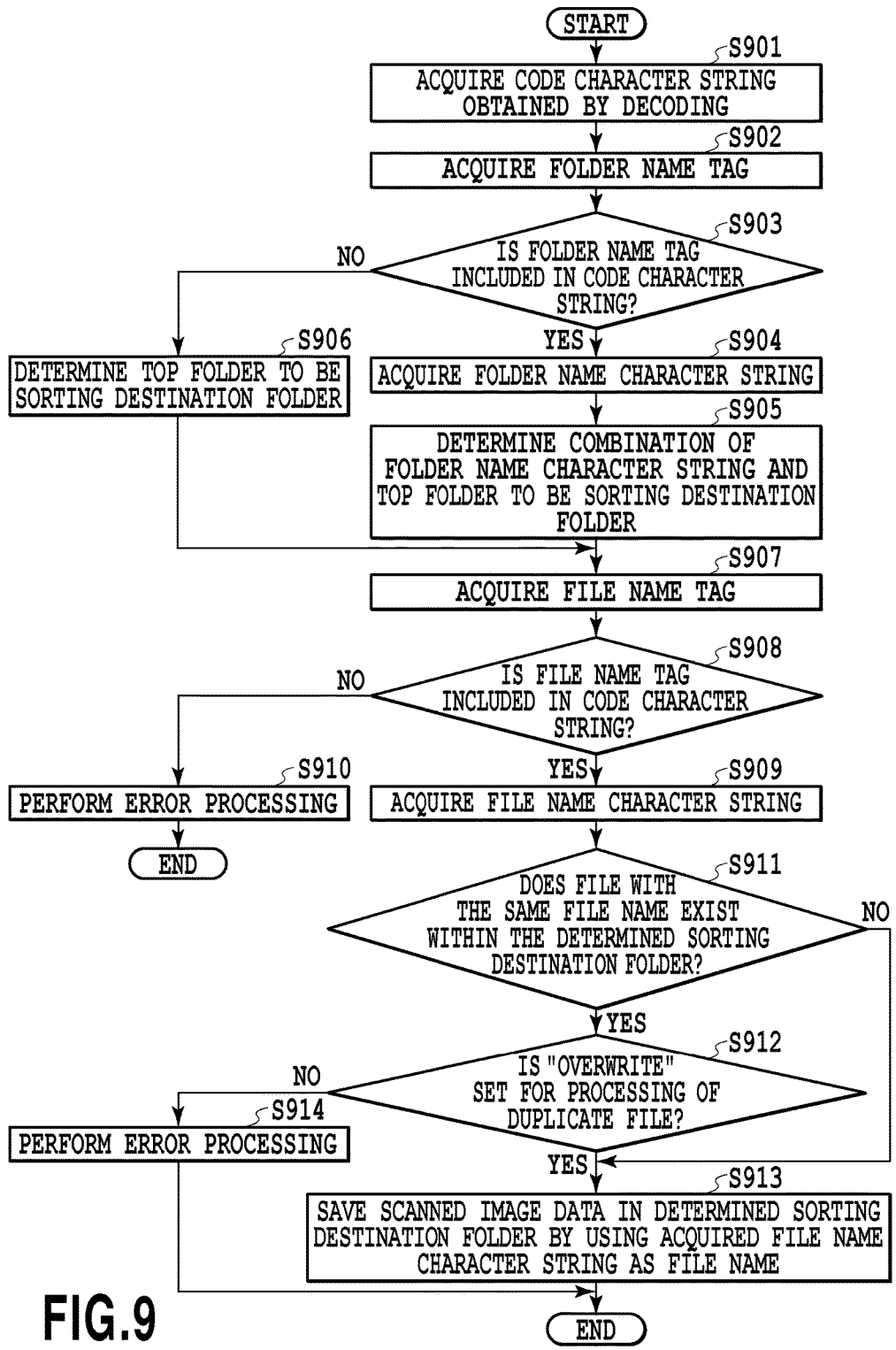
FIG. 9 is a flowchart showing a flow of processing to determine and save a sorting destination folder and a file name of scanned image data according to a first embodiment.

FIG. 9 is a flowchart showing a flow of the processing to determine and save a sorting destination folder and a file name of the scanned image data that is generated in the flow in FIGS. 8A and 8B.

At step 901, the control unit 111 acquires the code character string, which is obtained by decoding a code, from the decoding unit 116. In the example of the code indicated by the reference symbol 204 in FIG. 2, "FOLDER: Suzuki; FILENAME: A company delivery slip" is acquired as the code character string.

At step 902, the control unit 111 acquires the folder name tag (specified in the area 633 on the File save setting screen 630) specified in the selected routine work.

At step 903, the control unit 111 determines whether the folder name tag that is acquired at step 902 is included in the code character string that is acquired at step 901. In the case where the results of the determination indicate that the folder name tag is included in the code character string, the processing proceeds to step 904. On the other hand, in the case where the folder name tag is not included in the code character string, the processing proceeds to step 906.

At step 904, the control unit 111 acquires the folder name character string based on the folder name tag. In the case of the present embodiment in which "FOLDER: Suzuki; FILENAME: A company delivery slip" is acquired as the character string, the folder name tag is "FOLDER:", and therefore, the folder character string that is acquired is "Suzuki".

At step 905, the control unit 111 determines the combination of the folder character string that is acquired at step 904 and the top folder to be the sorting destination folder. For example, in the case where the top folder is "share" (see FIG. 3), on a condition that the folder character string is "Suzuki", the sorting destination folder is "share/Suzuki", which is the combination of both.

At step 906, the control unit 111 determines the top folder to be the sorting destination folder.

At step 907, the control unit 111 acquires the file name tag (specified in the area 637 on the File save setting screen 630) specified in the selected routine work.

At step 908, the control unit 111 determines whether the file name tag that is acquired at step 907 is included in the code character string that is acquired at step 901. In the case where the results of the determination indicate that the file name tag is included in the code character string, the processing proceeds to step 909. On the other hand, in the case where the file name tag is not included in the code character string, the processing proceeds to step 910.

At step 909, the control unit 111 acquires the file name character string based on the file name tag. In the case of the present embodiment in which "FOLDER: Suzuki; FILENAME: A company delivery slip" is acquired as the code character string, the file name character string is "A company delivery slip" and the filename is "A company delivery slip.pdf" in view of the file format described previously.

At step 910, the control unit 111 notifies a user of the fact that the file name tag is not found in the detected code by, for example, displaying a message screen on the operation/display unit 112 and terminates the processing after the error processing.

At step 911, the control unit 111 determines whether a file with the same file name (i.e., a file that uses the same character string as that of the file name character string that is acquired at step 909 as its file name) already exits within the sorting destination folder that is determined at step 905 or step 906. In the case where the results of the determination indicate that a file with the same file name already exists, the processing proceeds to step 912. On the other hand, in the case where a file with the same file name does not exist, the processing proceeds to step 913.

At step 912, the control unit 111 determines whether the processing of duplicate file (specified in the area 635 on the File save setting screen 630) specified in the selected routine work is "Overwrite". In the case where the results of the determination indicate "Overwrite", the processing proceeds to step 913. On the other hand, in the case where "Overwrite" is not specified, the processing proceeds to step 914.

At step 913, the control unit 111 stores scanned image data in the sorting destination folder that is determined at step 905 or step 906 by using the file name character string that is acquired at step 909 as a file name.

At step 914, the control unit 111 notifies a user of the fact that it is not possible to save the file because a file that uses the specified character string as its file name already exists and a duplicate name will result by, for example, displaying a message screen on the operation/display unit 112 and terminates the processing after the error processing.

In the case where the folder name tag or the file name tag is not set on the File save setting screen 630, it may also be possible to create a folder, to name a file name, and so on, by using date information on the scan of a template, such as the day, hour, minute, and second.

Further, in the present embodiment, the processing to store the image data of a document in the file server is explained, but it is possible to widely apply the present embodiment to the case where predetermined processing is performed based on information that is obtained by decoding.

As described above, according to the present embodiment, the search position of a code that exists on a document is specified by a user or an administrator. Then, at this time, a position other than the specified position is also searched efficiently, and therefore, it is possible to perform a code search at a high speed and also to cope with the case where a code exists in an area other than the predetermined area of the image data that is obtained by scanning the document.

Second Embodiment

In the first embodiment, it is made possible for a user to specify the folder name tag and the file name tag on the File save setting screen as shown in FIG. 6D (input areas 633 and 634). Next, an aspect is explained as a second embodiment, in which it is made possible for a user to specify a delimiter and a character code in addition to the tag. Explanation of the portions in common to those of the first embodiment is omitted or simplified and in the following, different points are explained mainly.

Figure 10A:
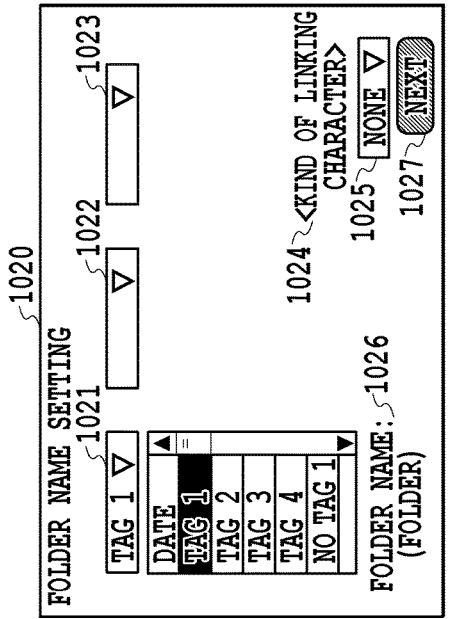
FIGS. 10A to 10D are diagrams explaining an example in the case where a file name and a folder name are embedded with tags attached in a code that is attached to a template.
Figure 10B:
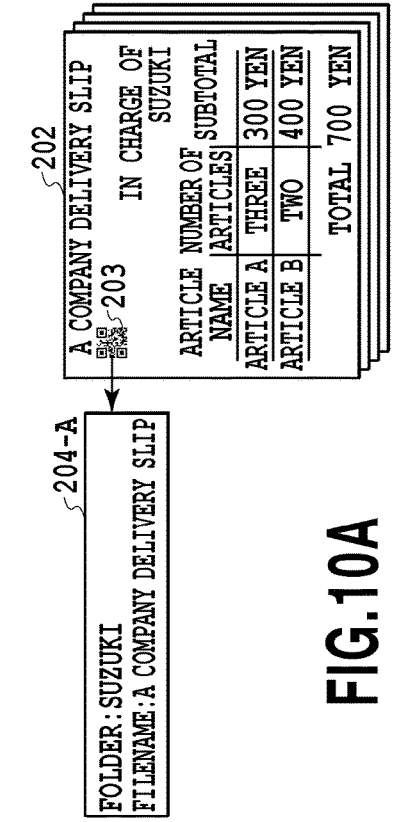
Figure 10C:
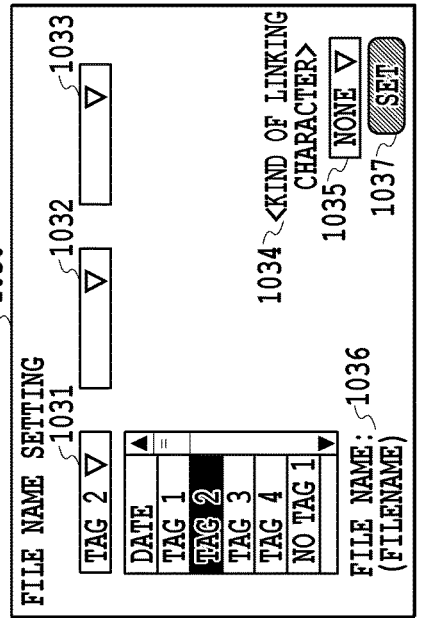
Figure 10D:
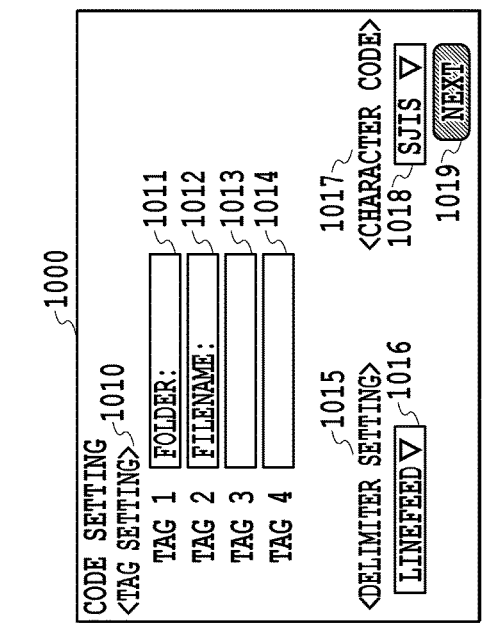

FIGS. 10A to 10D are diagrams explaining an example of the case where a file name and a folder name are embedded with a tag attached in a code that is attached to a template. FIG. 10A shows the way the code 203 is attached to the template 202, which is the same as that shown in FIG. 2, and a file name and a folder name are embedded with a tag attached and with a linefeed within information 204-A that is obtained by decoding the code 203. In the following, for convenience of explanation, character string data (value) specified by a tag is called a "tag value" and what includes only character string data not accompanied by a tag is called a "no-tag value". A UI screen 1000 shown in FIG. 10B is a code setting screen on which a setting for acquiring a tag value or a no-tag value from a code in flowcharts (flowchart of the processing to determine and save a storage destination folder and a file name of scanned image data) in FIGS. 15A-15C, to be described later.

First, in a tag setting box 1010 within the Code setting screen 1000, it is possible to set a plurality of tags included in a code and here, it is made possible to set four tags in total in input areas 1011 to 1014 corresponding to tag 1 to tag 4, respectively. Here, in order to acquire a tag value "Suzuki" of the information 204-A that is obtained by decoding the code 203, "FOLDER:" is input in the input area 1101 corresponding to tag 1 and in order to acquire a tag value "A company delivery slip", "FILENAME:" is input in the input area 1012 corresponding to tag 2. Further, within the Code setting screen 1000, there exists a delimiter setting box 1015 for specifying a delimiter that delimits a plurality of parameters (here, folder name and file name) included in the code 203. Here, the two parameters are delimited by a linefeed, and therefore, "LINEFEED" is selected in a pull-down selection area 1016. As a mark that is used generally as a delimiter, there are a comma, a semicolon, a space, etc., in addition to the linefeed. Further, on the Code setting screen 1000, a character code setting box 1017 for specifying a character code of the character string included in the code 203 also exists and "SJIS" is selected in a similar pull-down selection area 1018. In the case where the character code of the character string included in the code 203 is not known in advance, it is not possible to find the specified delimiter from the character string data, and therefore, it is made possible to set the character code at the same time. What can be specified as the character code includes, for example, JIS, EUC, etc., in addition to SJIS. Then, by a "Next" button 1019 being pressed down, the screen makes a transition to a Folder name setting screen 1020 shown in FIG. 10C.

The Folder name setting screen 1020 is a screen on which a setting for automatically generating a folder name by using the character string data that is acquired from the code 203 and information on the current date (date of scan, date of data reception, etc.) is performed. Within the Folder name setting screen 1020, there exist areas (hereinafter, name element selection areas) 1021 to 1023 for selecting three name elements, i.e., first to third name elements and in each pull-down list, nine alternatives in total, i.e., four "tag values", four "no-tag values", and one "date", are displayed and it is made possible to select one name element therefrom. In the present embodiment, the alternatives are those as described above because the four tag values at the maximum and the four no-tag values at the maximum are acquired in the flowcharts in FIGS. 15A-15C, to be described later, but the number of name element selection areas and the number of alternatives in each selection area are arbitrary. On the Folder name setting screen 1020 shown in FIG. 10C, it is made possible to generate a folder name by selecting three name elements at the maximum in the name element selection areas 1021 to 1023 and using the character strings associated therewith. On the Folder name setting screen 1020, there also exists a linking character setting box 1024 for setting the kind of a linking character to link the character strings associated with the respective selected name elements. The kind of the linking character includes a hyphen, an under bar, a space, etc. Here, in FIG. 10C, in the name element selection area 1021, "tag 1" is selected and nothing is selected in the name element selection areas 102 and 1023. Because only the character string of "tag 1" is used as the folder name as described above, in a selection area 1025 of the linking character setting box 1024, "NONE" is selected. Then, in a folder name label box 1026, the contents that are set on this screen (here, "(FOLDER)") are displayed. By the setting in FIG. 10C, the folder name is generated by using the tag value corresponding to FOLDER: of tag 1, and therefore, in the case where the results of decoding the code that is attached to the document are 204-A in FIG. 10A, the folder name is generated as "Suzuki". Then, by a "NEXT" button 1027 being pressed down, the screen makes a transition to a File name setting screen 1030.

The File name setting screen 1030 is a screen on which a setting for automatically generating a file name by using the character string data that is acquired from the code 203 and information on the current date. On the File name setting screen 1030, there also exist three name element selection areas, i.e., first to third name element selection areas 1031 to 1033 as on the Folder name setting screen 1020. Then, in each pull-down list, nine alternatives in total, i.e., four "tag values", four "no-tag values", and one "date" (date of scan, date of data reception, etc.), are displayed and it is made possible to select one name element therefrom. On the File name setting screen 1030 shown in FIG. 10D, it is made possible to generate a file name by selecting three name elements at the maximum in the name element selection areas 1031 to 1033 and using the character strings associated therewith. Further, on the File name setting screen 1030, as on the Folder name setting screen 1020, there also exists a linking character setting box 1034 for setting the kind of a linking character to link the character strings selected in the name element selection areas 1031 to 1033. Here, as a setting for automatically generating a file name by " ", "tag 2" is selected in the name element selection area 1031 in FIG. 10D, and nothing is selected in the name element selection areas 1032 and 1033. Because only the character string of "tag 2" is used as the file name as described above, in a selection area 1035 of the linking character setting box 1034, "NONE" is selected. Then, in a file name label 1036, the contents that are set on this screen (here, "FILENAME") are displayed. To the file name that is generated, an extension (in the case of PDF, ".pdf") is added to the end in accordance with the file format to be output. By the setting in FIG. 10D, the file name is generated by using the tag value corresponding to "FILENAME:" of tag 2, and therefore, in the case where the results of decoding the code that is attached to the document are 204-A in FIG. 10A, the file name is generated as "A company delivery slip.pdf". Then, by a "Set" button 1037 being pressed down, the contents that are set on each of the setting screens 1000, 1020, and 1030 described above are saved in the storage unit 115 of the MFP 110.

FIGS. 11A to 11D are diagrams explaining an example of the case where a plurality of parameters, such as a user name and a division name, is embedded with a tag attached in a code that is attached to a template. FIG. 11A shows the way a user name, a division name, a section name, and an article name are embedded with a tag attached and with a linefeed within information 204-B that is obtained by decoding the code 203. The UI screen shown in FIG. 11B is the Code setting screen 1000 shown in FIG. 10B described previously. Here, in order to acquire the tag value "Suzuki" within the information 204-B that is obtained by decoding the code 203, in the input area 1011 corresponding to tag 1, "USER:" is input, and in order to acquire the tag value "Sales development division I", in the input area 1012 corresponding to tag 2, "DIVISION:" is input. Further, in order to acquire the tag value "Sales development section II", in the input area 1013 corresponding to tag 3, "SECTION:" is input and in order to acquire the tag value "NotePC", in the input area 1014 corresponding to tag 4, "ARTICLE:" is input. Then, in the delimiter setting box 1015, in order to indicate that these four parameters are delimited by a linefeed, "LINEFEED" is selected in the pull-down selection area 1016. In the selection area 1018 of the character code setting box 1017, as the character code of the character string included in the information 204-B that is obtained by decoding, "UTF-8" is selected.

Next, on the Folder name setting screen 1020 shown in FIG. 11C, "tag 2" is selected in the name element selection area 1021 and "tag 3" is selected in the name element selection area 1022, respectively, and nothing is selected in the name element selection area 1023. Further, in the linking character setting box 1024, "_(UNDER BAR)" is selected. Then, in the folder name label box 1026, the contents (here, "(DIVISION)_(SECTION") that are set on this screen are displayed. By the setting in FIG. 11C, the folder name is generated by using the tag values corresponding to tag 2 and tag 3, respectively, and therefore, in the case where the results of decoding the code that is attached to the document are 204-B in FIG. 11A, the folder name is generated as "Sales development division I_Sales development section II".

Then, on the File name setting screen 1030 shown in FIG. 11D, the setting for automatically generating a file name by " " is performed. Specifically, in the name element selection area 1031, "tag 1" (USER:) is selected, in the name element selection area 1032, "tag 4" (ARTICLE) is selected, and in the name element selection area 1033, "date" is selected, respectively. Further, in the selection area 1035 of the linking character setting box 1034, "- (HYPHEN)" is selected. Then, in the file name label box 1036, the contents (here, "(USER)-(ARTICLE)-YYMMDDHHMM") that are set on this screen are displayed. By the setting in FIG. 14D, the file name is generated by using the tag value corresponding to tag 1, the tag value corresponding to tag 4, and the date, and therefore, in the case where the results of decoding the code that is attached to the document are 204-B in FIG. 11A, the file name is generated as "Suzuki-NotePC-YYM-MDDhhmm.pdf" (year, month, day, hour, and minute are input to YYMMDDhhmm).

The other points, such as the format of a file name at the time of saving and the function of the "Set" button 1037, are the same as those in the example explained in FIGS. 10A to 10D, and therefore, explanation is omitted.

FIGS. 12A to 12D are diagrams explaining an example of the case where a file name and a folder name are embedded with no tag in a code that is attached to a template. FIG. 12A shows the way the code 203 is attached to the template 202 and a file name and a folder name are embedded with no tag and with no linefeed within information 204-C that is obtained by decoding the code 203. The UI screen shown in FIG. 12B is the Code setting screen 1000 shown in FIG. 10B described previously. Here, no tag is included within the information 204-C that is obtained by decoding the code 203, and therefore, nothing is input in the input areas 1011 to 1014 corresponding to tag 1 to tag 4, respectively. Then, in order to indicate that the two parameters are delimited by a semicolon ";", in the delimiter setting box 1015, ";" is selected in the pull-down selection area 1016. Further, in the selection area 1018 of the character code setting box 1017, as the character code of the character string included in the information 204-C that is obtained by decoding, "EUC" is selected.

Next, on the Folder name setting screen 1020 shown in FIG. 12C, as a setting for automatically generating the folder name as "A company folder", "no tag 2" is selected in the name element selection area 1021 and nothing is selected in the name element selection areas 1022 and 1023. Then, in the selection area 1025 of the linking character setting box 1024, only the character string of "no tag 2" is used as the folder name, and therefore, "NONE" is selected. Then, in the folder name label box 1026, the contents (here, "(no tag 2)") that are set on this screen are displayed.

Further, on the File name setting screen 1030 shown in FIG. 12D, as a setting for automatically generating the file name as "A company delivery slip", "no tag 1" is selected in the name element selection area 1031 and nothing is selected in the name element selection areas 1032 and 1033. Then, in the selection area 1035 of the linking character setting box 1034, only the character string of "no tag 1" is used as the file name, and therefore, "NONE" is selected. In the file name label box 1036, the contents (here, "(no tag 1)") that are set on this screen are displayed.

The other points, such as the format of a file name at the time of saving and the function of the "Set" button 1037, are the same as those explained in the example in FIGS. 10A to 10D, and therefore, explanation is omitted.

Figure 13A:
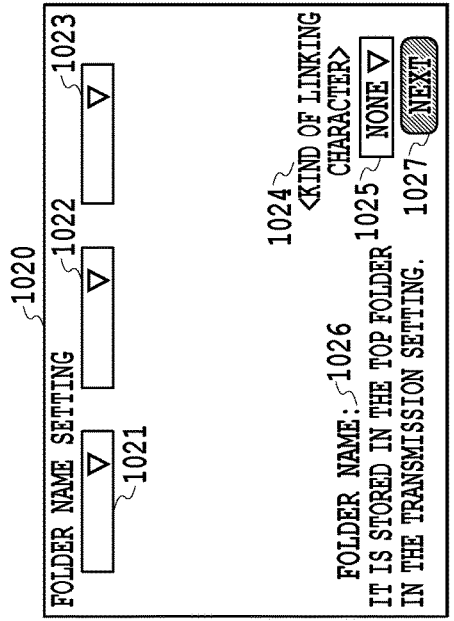
FIGS. 13A to 13D are diagrams explaining an example in the case where only a file name is embedded with no tag attached in a code that is attached to a template.
Figure 13B:
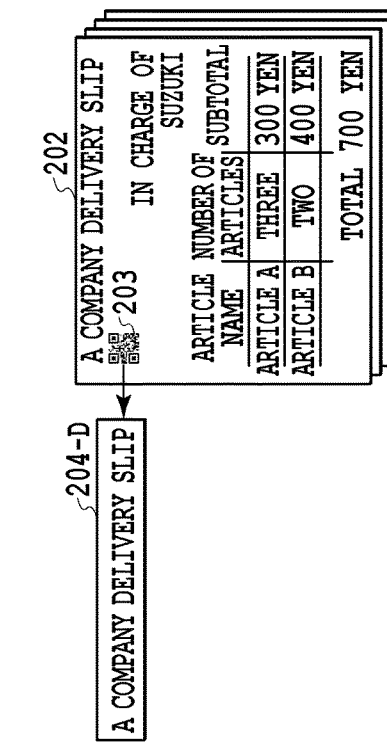

FIGS. 13A to 13D are diagrams explaining an example of the case where only a file name is embedded with no tag in a code that is attached to a template. FIG. 13A shows the way the code 203 is attached to the template 202 and a file name is embedded with no tag within information 204-D that is obtained by decoding the code 203. The UI screen shown in FIG. 13B is the Code setting screen 1000 shown in FIG. 10B described previously. Here, no tag is included within the information 204-D that is obtained by decoding the code 203, and therefore, nothing is input in the input areas 1011 to 1014 corresponding to tag 1 to tag 4, respectively. Then, only one parameter is included within the information 204-D that is obtained by decoding, and therefore, nothing is selected in the selection area 1016 of the delimiter setting box 1015. Further, in the selection area 1018 of the character code setting box 1017, as the character code of the character string included in the information 204-D that is obtained by decoding, "SJIS" is selected.

Figure 13C:
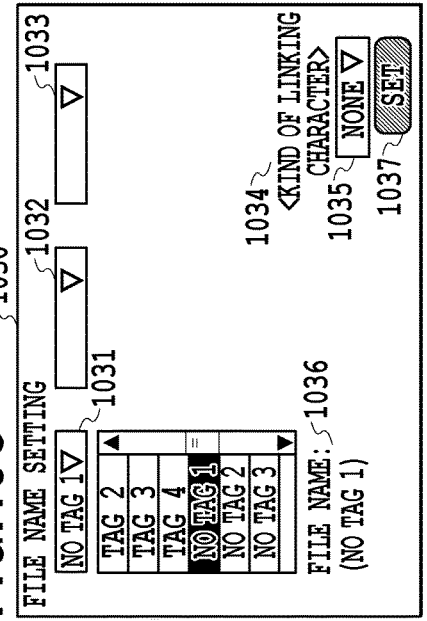

Next, on the Folder name setting screen 1020 shown in FIG. 13C, a parameter that can be used as a folder name is not included within the information 204-D that is obtained by decoding, and therefore, nothing is selected in all the name element selection areas 1021 to 1023. Then, in the selection area 1025 of the linking character setting box 1024, "NONE" is selected. Then, in the folder name label box 1026, a message to the effect that it is stored in the top folder (here, "share" specified in the area 632 in FIG. 6D), which is the folder in the uppermost layer of the file server 130 is displayed.

Figure 13D:
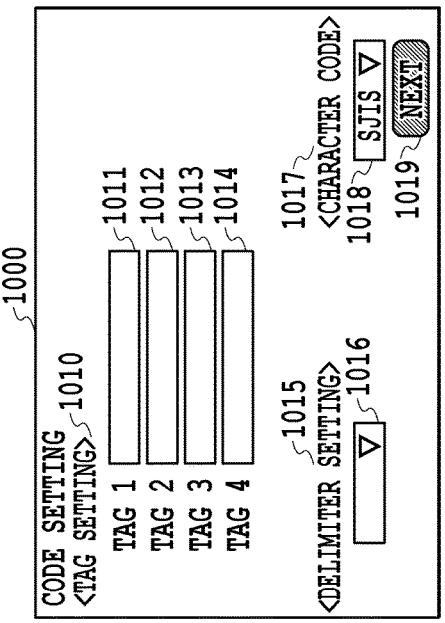

Further, on the File name setting screen 1030 shown in FIG. 13D, as a setting for automatically generating the file name as "A company delivery slip", as in FIG. 12D described previously, "no tag 1" is selected in the name element selection area 1031 and nothing is selected in the name element selection areas 1032 and 1033. Then, in the selection area 1035 of the linking character setting box 1034 also, "NONE" is selected. Then, in the folder name label box 1036, the contents (here "(no tag 1)") that are set on this screen are displayed.

The other points, such as the format of a file name at the time of saving and the function of the "Set" button 1037, are the same as those in the example explained in FIGS. 10A to 10D, and therefore, explanation is omitted.

FIGS. 14A to 14D are diagrams explaining an example of the case where only a folder name is embedded with no tag in a code that is attached to a template. FIG. 14A shows the way the code 203 is attached to the template 202 and a folder name is embedded with no tag within information 204-E that is obtained by decoding the code 203. The UI screen shown in FIG. 14B is the Code setting screen 1000 shown in FIG. 10B described previously. Here, no tag is included within the information 204-E that is obtained by decoding the code 203, and therefore, nothing is input in the input areas 1011 to 1014 corresponding to tag 1 to tag 4, respectively. Then, only one parameter is included within the information 204-E that is obtained by decoding, and therefore, as in FIG. 13B, nothing is selected in the selection area 1016 of the delimiter setting box 1015. Further, in the selection area 1018 of the character code setting box 1017, as the character code of the character string included within the information 204-E that is obtained by decoding, "UTF-8" is selected.

Next, on the Folder name setting screen 1020 shown in FIG. 14C, as a setting for automatically generating the folder name as "A company folder", in the name element selection area 1021, "no tag 1" is selected and nothing is selected in the name element selection areas 1022 and 1023. Then, in the selection area 1025 of the linking character setting box 1024, only the character string of "no tag 1" is used as the folder name, and therefore, "NONE" is selected. Then, in the folder name label box 1026, the contents (here, "(no tag 1)") that are set on this screen are displayed.

Further, on the File name setting screen 1030 shown in FIG. 14D, a parameter that can be used as a file name is not included within the information 204-E that is obtained by decoding, and therefore, nothing is selected in all the name element selection areas 1031 to 1033. Then, in the selection area 1035 of the linking character setting box 1034, "NONE" is selected. As a method for determining a filename in this case, for example, the method in which consecutive numbers are attached to fixed character strings is common, and in the file name label 1036, a message to that effect is displayed.

The other points, such as the format of a file name at the time of saving and the function of the "Set" button 1037, are the same as those explained in the example in FIGS. 10A to 10D, and therefore, explanation is omitted.

As described above, on the Folder name setting screen 1020 and the File name setting screen 1030 of the present embodiment, it is also made possible for a user to set the way a character string with no tag is handled.

Figure 15B:
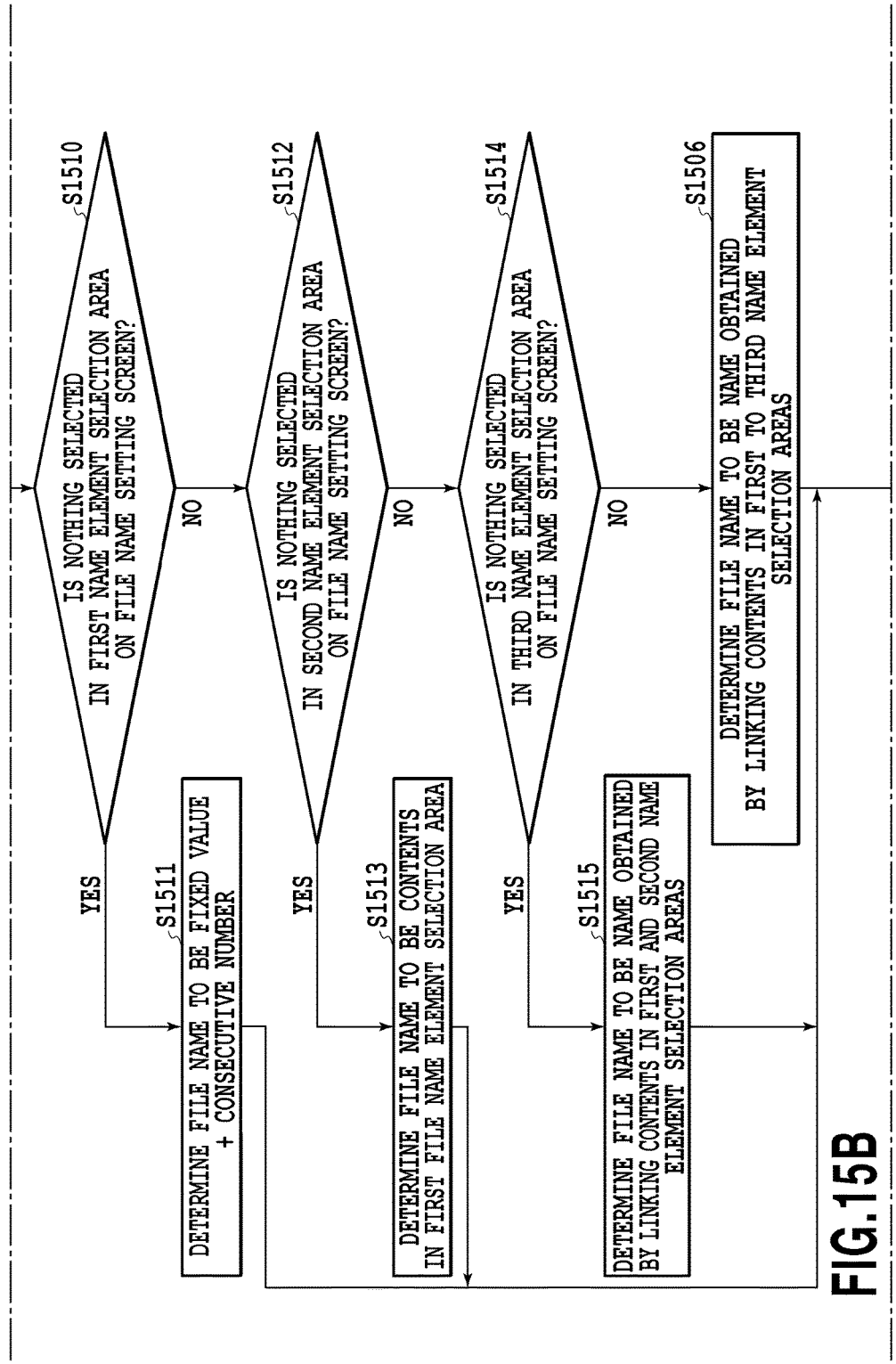
Figure 15C:
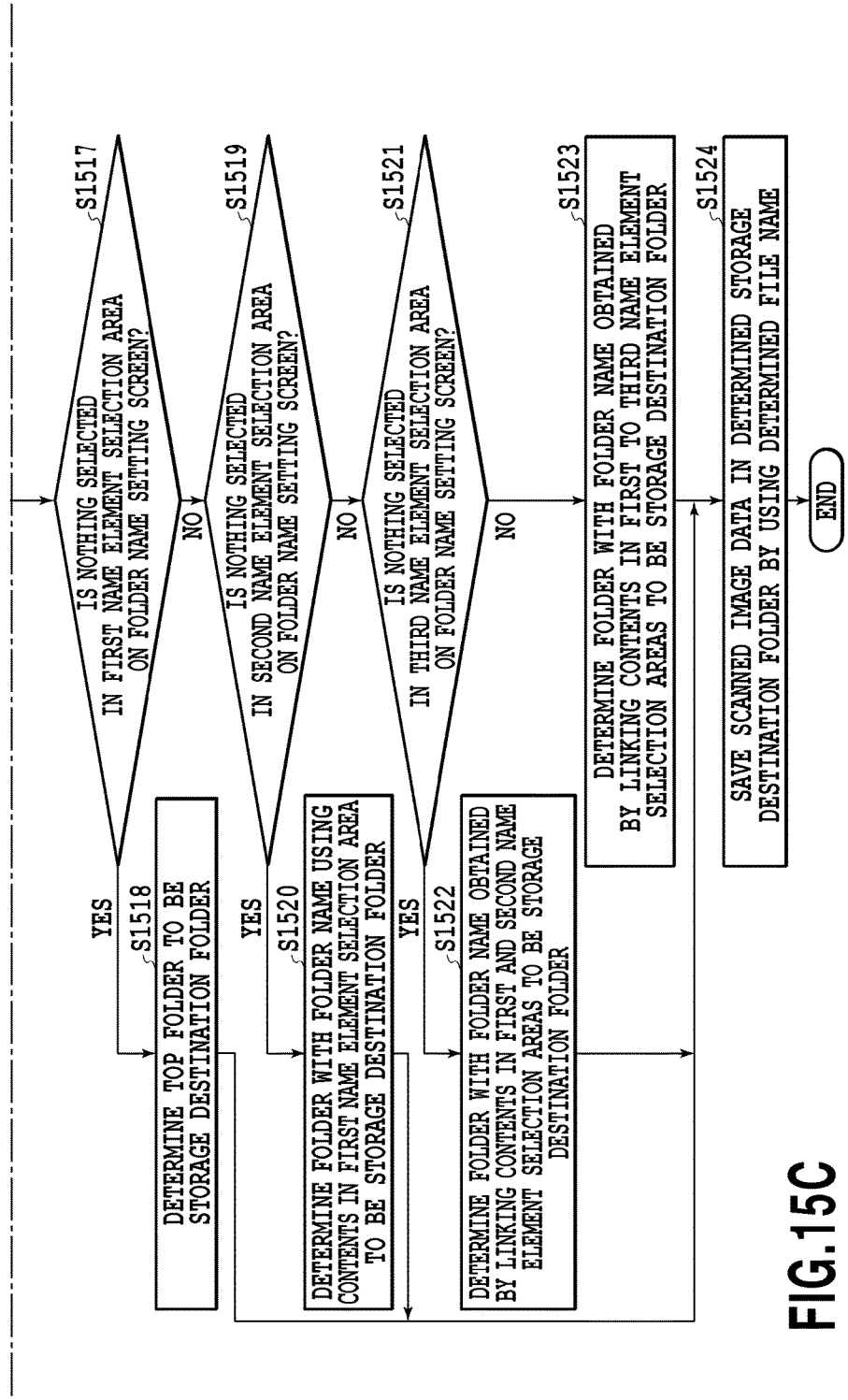

FIGS. 15A-15C are flowcharts showing a flow of processing to determine and save a storage destination folder and a file name of generated scanned image data.

At step 1501, the control unit 111 receives the results obtained by decoding a code from the decoding unit 116 and acquires character string data. Specifically, the control unit 111 acquires character string data by analyzing (interpreting) the data of the decoding results as the data of the character code that is set in the character code setting box 1017 on the Code setting screen 1000. By designing the configuration in this manner, it is possible to acquire character string data without garbling. For example, in the case of the decoding information 204-B in FIG. 11A, "USER: Suzuki/n DIVISION: Sales development division I/n SECTION: Sales development section II/n ARTICLE: NotePC" is acquired as the character string data.

At step 1502, the control unit 111 divides the acquired character string data in accordance with the contents of setting in the delimiter setting box 1015 on the Code setting screen 1000. For example, in the case of the decoding information 204-B in FIGS. 11A to 11D, "LINEFEED" is specified as the delimiter. Consequently, the character string data divided into four parts: "USER: Suzuki", "DIVISION: Sales development division I", "SECTION: Sales development section II", and "ARTICLE: NotePC" by using the linefeed code "/n" is acquired as a result (hereinafter, the character string after the division is called the "divided character string".

At step 1503, the control unit 111 initializes a variable i of the loop counter and a variable N of the no-tag value counter (i=1, N=1 are set).

At step 1504, the control unit 111 determines whether any tag that is set in the tag setting box 1010 on the Code setting screen 100 is included in the ith divided character string. In the case where a tag that is set is included in the target divided character string, the processing proceeds to step 1505. On the other hand, in the case a tag that is set is not included in the target divided character string, the processing proceeds to step 1506.

At step 1505, the control unit 111 acquires the character string corresponding to the tag value from the divided character string and stores and holds the character string as a value associated with relevant tag X (in the present embodiment, X is one of 1 to 4) in the storage unit 115. For example, in the case of the decoding information 204-B in FIGS. 11A to 11D, the first divided character string "USER: Suzuki" includes the tag character string "USER:" that is set in tag 1, and therefore, the character string "Suzuki" that follows this tag character string is acquired as a tag value and is held as a value associated with tag 1.

At step 1506, the control unit 111 stores and holds the ith divided character string as a no-tag value N in the storage unit 115.

At step 1507, the control unit 111 increments (+1) the variable N of the no-tag value counter.

At step 1508, the control unit 111 increments (+1) the variable i of the loop counter.

At step 1509, the control unit 111 determines whether there is a divided character string on which the processing has not been performed yet. Specifically, whether the variable i of the loop counter has reached the maximum number (4 in the present embodiment) of tag values desired to be acquired is determined. In the case where the processing has been completed for all the divided character strings, the processing proceeds to step 1510. On the other hand, in the case where there is a divided character string on which the processing has not been performed yet, the processing returns to step 1504 and the processing is continued for the next divided character string as a target.

At step 1510, the control unit 111 determines whether or not nothing is selected in the name element selection area 1031 (first name element) on the File name setting screen 1030. In the case where the first name element is not selected yet, the processing proceeds to step 1511. On the other hand, in the case where the first name element is selected, the processing proceeds to step 1512.

At step 1511, the control unit 111 determines the file name to be the fixed value+consecutive number (e.g., "FILE_001").

At step 1512, the control unit 111 determines whether or not nothing is selected in the name element selection area 1032 (second name element) on the Filename setting screen 1030. In the case where the second name element is not selected yet, the processing proceeds to step 1513. On the other hand, in the case where the second name element is selected, the processing proceeds to step 1514.

At step 1513, the control unit 111 determines the character string of the name element (first name element) that is selected in the name element selection area 1031 to be the file name. For example, in the case where tag X (X is one of 1 to 4) is set as the first name element, the tag value associated with tag X that is held at step 1505 is determined to be the file name.

At step 1514, the control unit 111 determines whether or not nothing is selected in the name element selection area 1033 (third name element) on the File name setting screen 1030. In the case where the third name element is not selected yet, the processing proceeds to step 1515. On the other hand, in the case where the third name element is selected, the processing proceeds to step 1516.

At step 1515, the control unit 111 determines the file name to be the name, which is obtained by linking the character strings of the name elements (first and second name elements) that are selected in the name element selection areas 1031 and 1032 by using the linking character that is selected in the linking character setting box 1034.

At step 1516, the control unit 111 determines the file name to be the name, which is obtained by linking the character strings of the name elements (first to third name elements) that are selected in the name element selection areas 1031 to 1033 by using the linking character that is selected in the linking character setting box 1034.

Next, at step 1517, the control unit 111 determines whether or not nothing is selected in the name element selection area 1021 (first name element) on the Folder name setting screen 1020. In the case where the first name element is not selected yet, the processing proceeds to step 1518. On the other hand, in the case where the first name element is selected, the processing proceeds to step 1519.

At step 1518, the control unit 111 determines not to generate a folder and determines the storage destination folder of the file to be the folder (top folder 300 in FIG. 3) in the uppermost layer of the file server 130.

At step 1519, the control unit 111 determines whether or not nothing is selected in the name element selection area 1022 (second name element) on the Folder name setting screen 1020. In the case where the second name element is not selected yet, the processing proceeds to step 1520. On the other hand, in the case where the second name element is selected, the processing proceeds to step 1521.

At step 1520, the control unit 111 determines the character string of the name element (first name element) that is selected in the name element selection area 1021 to be the folder name of the storage destination folder. For example, in the case where tag X (X is one of 1 to 4) is set as the first name element, the tag value associated with tag X that is held at step 1505 is determined to be the folder name.

At step 1521, the control unit 111 determines whether or not nothing is selected in the name element selection area 1023 (third name element) on the Folder name setting screen 1020. In the case where the third name element is not selected yet, the processing proceeds to step 1522. On the other hand, in the case where the third name element is selected, the processing proceeds to step 1523.

At step 1522, the control unit 111 determines the name, which is obtained by linking the character strings of the name elements (first and second name elements) that are selected in the name element selection areas 1021 and 1022 by using the linking character that is selected in the linking character setting box 1024, to be the folder name of the storage destination folder.

At step 1523, the control unit 111 determines the name, which is obtained by linking the character strings of the name elements (first to third name elements) that are selected in the name element selection areas 1021 to 1023 by using the linking character that is selected in the linking character setting box 1024, to be the folder name of the storage destination folder.

Finally, at step 1524, the control unit 111 stores the scanned image data in the storage destination folder within the file server 130, which is determined in the present flow, by using the file name that is determined in the present flow.

According to the embodiments, it is made possible to automatically generate a file name and a folder name at the time of sorting and transmission only by changing the setting without the need to take the trouble, i.e., to change the program in accordance with the format of the character string data that is embedded in a code that is attached to a document.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention for solving the first problem described above, it is possible to perform a code search both at a high speed and with efficiency based on the position specified by a user.

Further, according the present invention for solving the second problem described above, it is possible to generate a file name, a storage destination folder name, etc., by extracting necessary data from a code even in the case where the code is created in the format unique to a document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-006578, filed Jan. 16, 2015, and No. 2015-133836, filed Jul. 2, 2015, which are hereby incorporated by reference wherein in their entirety.

What is claimed is:

1. An apparatus comprising:
a processor; and
a memory that stores a program to be executed by the processor to perform a process which comprises:
receiving a position instructed by a user, wherein the instructed position indicates a position of a code that exists on a document;
obtaining image data by scanning a document with a scanner after receiving the instructed position;
searching the obtained image data for the code at both of a first position corresponding to the instructed position and a second position obtained by reversing the first position;
obtaining information by decoding the code that has been found in the search; and
performing processing for the obtained image data based on the information obtained by the decoding.

2. The apparatus according to claim 1, wherein
the processor further determines whether an orientation of the document placed on the scanner is the same as an orientation specified on a setting screen, and
the first position is determined by rotating the instructed position by 90 degrees when the orientation of the placed document is different from the orientation specified on the setting screen, and
the second position is determined by rotating the instructed position by 270 degrees when the orientation of the placed document is different with the orientation specified on the setting screen, and
the first position is determined by rotating the instructed position by 180 degrees when the orientation of the placed document is the same as the orientation specified on the setting screen.

3. The apparatus according to claim 1, wherein
in a case where the code is found at the second position in the search, the processing performed for the image data includes processing to reverse the obtained image data.

4. The apparatus according to claim 1, wherein
the position of a code that exists on a document is automatically searched in the search, the position of the founded code is saved in a storage unit, and in subsequent scans, the position of the founded code that is saved in the storage unit is specified as a search target area in the search.

5. The apparatus according to claim 1, wherein
the processing performed for the image data is to store the obtained image data into a storage destination folder, and wherein the storage destination folder is determined based on information that is obtained by the decoding.

6. The apparatus according to claim 1, wherein
the processing performed for the image data is to store the obtained image data into a folder after attaching a file name thereto, and wherein the file name is determined based on information that is obtained by the decoding.

7. An apparatus comprising:
a processor; and
a memory that stores a program to be executed by the processor to perform a process which comprises:
receiving a position information instructed by a user and an instruction for executing a scan of a document, wherein the instructed position information indicates a position of a code that exists on the document;
obtaining image data by scanning a document based on the scan instruction;
searching the obtained image data for a code by taking both of a first position that is specified by the position information and a second position that is obtained by rotating the first position by 180 degrees to be search target areas; and
performing processing on the image data based on information that is obtained by decoding a code that has been found in the search.

8. The apparatus according to claim 7, wherein the processor further determines an orientation of the document,
wherein, if the orientation of the obtained image data is different from a predetermined orientation,
the first position is a position obtained by rotating the instructed position information by 90 degrees, and
the second position is a position obtained by rotating the instructed position information by 270 degrees.

9. The apparatus according to claim 8, wherein
the instructed position information include information on the predetermined orientation of a document, and
in a case where the predetermined orientation that is included in the instructed position information agrees with an orientation of an actually placed document, the second position is a position obtained by rotating the first position by 180 degrees.

10. The apparatus according to claim 9, wherein
in a case where the code has been found at the second position obtained by rotating the first position by 180 degrees, the processing includes processing to rotate the image data by 180 degrees.

11. The apparatus according to claim 7, wherein the processor further displays a user interface screen on which a user instructs the position information and the instruction for executing a scan, wherein
on the user interface screen, a button to give the instructions exists, and
a position of a code in the position information, which is associated with the button, is a position obtained by automatically performing a search by taking the entire surface of a document as a code search target, or a position that is input manually by a user.

12. The apparatus according to claim 7, wherein
the performed processing is to store the obtained image data in a storage destination folder, and
the storage destination folder is determined based on information that is obtained by the decoding.

13. The apparatus according to claim 7, wherein
the performed processing is to store the obtained image data in a storage destination folder after attaching a file name thereto, and
the file name is determined based on information that is obtained by the decoding.

14. An image processing method executed by an apparatus including an operation screen for receiving a user's operation and a scanned that scans a document, the method comprising the steps of:
receiving a position instructed via the operation screen by a user, the instructed position indicating a position of a code that exists on a document;
obtaining image data by scanning a document with the scanner after the instructed position is received;
searching the obtained image data for a code at both of a first position corresponding to the instructed position and a second position obtained by reversing the first position;
obtaining information by decoding the code that has been found in the search; and
performing processing for the obtained image data based on the information that is obtained by the decoding.

15. A non-transitory computer readable storage medium storing a program for causing a computer to perform an image processing method which comprises the steps of:
receiving a position instructed by a user, the instructed position indicating a position of a code that exists on a document;
obtaining image data by scanning a document with a scanner after the instructed position is received;
searching the obtained image data for a code at both of a first position corresponding to the instructed position and a second position obtained by reversing the first position;
obtaining information by decoding the code that has been found in the search; and
performing processing for the obtained image data based on the information that is obtained by the decoding.

\* \* \* \* \*